(12) United States Patent
Osada et al.

(10) Patent No.: US 10,168,801 B2
(45) Date of Patent: Jan. 1, 2019

(54) ELECTRONIC PEN AND ELECTRONIC PEN SYSTEM

(75) Inventors: Takeshi Osada, Isehara (JP); Mayumi Yamaguchi, Atsugi (JP); Konami Izumi, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 1702 days.

(21) Appl. No.: 11/892,591

(22) Filed: Aug. 24, 2007

(65) Prior Publication Data

US 2008/0055279 A1 Mar. 6, 2008

(30) Foreign Application Priority Data

Aug. 31, 2006 (JP) .................................. 2006-236769

(51) Int. Cl.
*G06F 3/0354* (2013.01)
*G06F 3/033* (2013.01)
(Continued)

(52) U.S. Cl.
CPC .......... *G06F 3/03545* (2013.01); *G06F 3/033* (2013.01); *G06F 3/04883* (2013.01); *G06K 9/22* (2013.01); *G06F 3/03542* (2013.01); *G06F 3/044* (2013.01); *G06K 9/00402* (2013.01); *G06K 9/222* (2013.01); *H02J 7/025* (2013.01)

(58) Field of Classification Search
CPC .. G06F 3/03545; G06F 3/044; G06F 3/04883; G06F 3/03542; G06F 3/033; G06K 9/222; G06K 9/00402; G06K 9/22; H02J 7/025
USPC ........ 320/108, 114; 178/18.01, 19.01–19.06; 345/179–184; 382/314
See application file for complete search history.

(56) References Cited

U.S. PATENT DOCUMENTS 5,247,137 A * 9/1993 Epperson .................... 178/19.04
5,294,792 A * 3/1994 Lewis et al. .................. 250/221
(Continued)

FOREIGN PATENT DOCUMENTS

| JP | 08-030370 | 2/1996 |
| JP | 08-076915 | 3/1996 |
| JP | 2004-222457 A | 8/2004 |

OTHER PUBLICATIONS

Specification, claims and drawings for U.S. Appl. No. 11/717,686, filed Mar. 14, 2007.
(Continued)

*Primary Examiner* — Richard Isla
*Assistant Examiner* — Manuel Hernandez
(74) *Attorney, Agent, or Firm* — Robinson Intellectual Property Law Office; Eric J. Robinson

(57) ABSTRACT

To provide a small and light-weight writing instrument that can accurately read information written down on a display portion as electronic information. A pen-shaped device which includes a battery capable of being charged wirelessly from the outside, a first sensor which detects whether a pen nib has contact with a surface, a second sensor which detects movement of the pen nib in contact with the surface, a control circuit which is electrically connected to the first sensor and the second sensor, and a memory which is electrically connected to the control circuit, where the first sensor, the second sensor, the control circuit, and the memory operate by supply of electric power from the battery.

23 Claims, 20 Drawing Sheets

(51) Int. Cl.
*G06F 3/0488* (2013.01)
*G06F 3/044* (2006.01)
*G06K 9/22* (2006.01)
*G06K 9/00* (2006.01)
*H02J 7/02* (2016.01)

(56) References Cited

U.S. PATENT DOCUMENTS

| | | | |
|---|---|---|---|
| 5,455,466 A * | 10/1995 | Parks et al. | 307/104 |
| 5,475,401 A * | 12/1995 | Verrier | G06F 3/03545 178/18.03 |
| 5,748,808 A | 5/1998 | Taguchi et al. | |
| 5,854,448 A * | 12/1998 | Nozaki | G06F 3/041 178/18.01 |
| 5,883,338 A * | 3/1999 | Trunck et al. | 178/19.07 |
| 5,960,124 A | 9/1999 | Taguchi et al. | |
| 6,005,555 A * | 12/1999 | Katsurahira et al. | 345/174 |
| 6,020,849 A * | 2/2000 | Fukuzaki | 342/374 |
| 6,040,680 A * | 3/2000 | Toya et al. | 320/108 |
| 6,130,666 A | 10/2000 | Persidsky | 345/179 |
| 6,188,392 B1 * | 2/2001 | O'Connor et al. | 345/179 |
| 6,275,143 B1 * | 8/2001 | Stobbe | 340/10.34 |
| 6,396,471 B1 | 5/2002 | Hirakata | |
| 6,681,045 B1 * | 1/2004 | Lapstun et al. | 382/187 |
| 6,744,426 B1 * | 6/2004 | Okamoto et al. | 345/179 |
| 6,747,290 B2 | 6/2004 | Yamazaki et al. | |
| 7,042,196 B2 * | 5/2006 | Ka-Lai et al. | 320/108 |
| 7,211,986 B1 * | 5/2007 | Flowerdew et al. | 320/108 |
| 7,268,774 B2 * | 9/2007 | Pittel et al. | 345/179 |
| 7,342,575 B1 * | 3/2008 | Hartwell | G06F 3/03545 345/179 |
| 7,521,890 B2 * | 4/2009 | Lee et al. | 320/108 |
| 7,812,268 B2 * | 10/2010 | Ely | 178/18.03 |
| 7,868,873 B2 * | 1/2011 | Palay et al. | 345/173 |
| 7,907,130 B2 * | 3/2011 | Ely | 345/179 |
| 8,081,171 B2 * | 12/2011 | Adams et al. | 345/179 |
| 9,727,150 B2 * | 8/2017 | Stern | G06F 3/03545 |
| 2001/0006383 A1 * | 7/2001 | Fleck et al. | 345/179 |
| 2003/0063045 A1 * | 4/2003 | Fleming | G06F 3/03545 345/30 |
| 2004/0136083 A1 * | 7/2004 | Wang | G06F 3/0317 359/642 |
| 2005/0128191 A1 * | 6/2005 | Katsurahira et al. | 345/179 |
| 2005/0156915 A1 * | 7/2005 | Fisher | 345/179 |
| 2005/0162131 A1 | 7/2005 | Sennami et al. | |
| 2005/0254183 A1 | 11/2005 | Ishida et al. | |
| 2006/0007189 A1 * | 1/2006 | Gaines et al. | 345/179 |
| 2006/0028459 A1 * | 2/2006 | Underwood | G02B 26/06 345/179 |
| 2006/0061328 A1 * | 3/2006 | Trosper | 320/112 |
| 2006/0076922 A1 * | 4/2006 | Cheng et al. | 320/108 |
| 2006/0145659 A1 * | 7/2006 | Patino et al. | 320/108 |
| 2006/0151610 A1 * | 7/2006 | Chiang | G06F 3/03545 235/472.03 |
| 2006/0250381 A1 * | 11/2006 | Geaghan | G06F 3/0317 345/179 |

OTHER PUBLICATIONS

Specification, claims and drawings for U.S. Appl. No. 11/802,826, filed May 25, 2007.
Specification, claims and drawings for U.S. Appl. No. 11/798,817, filed May 17, 2007.

* cited by examiner

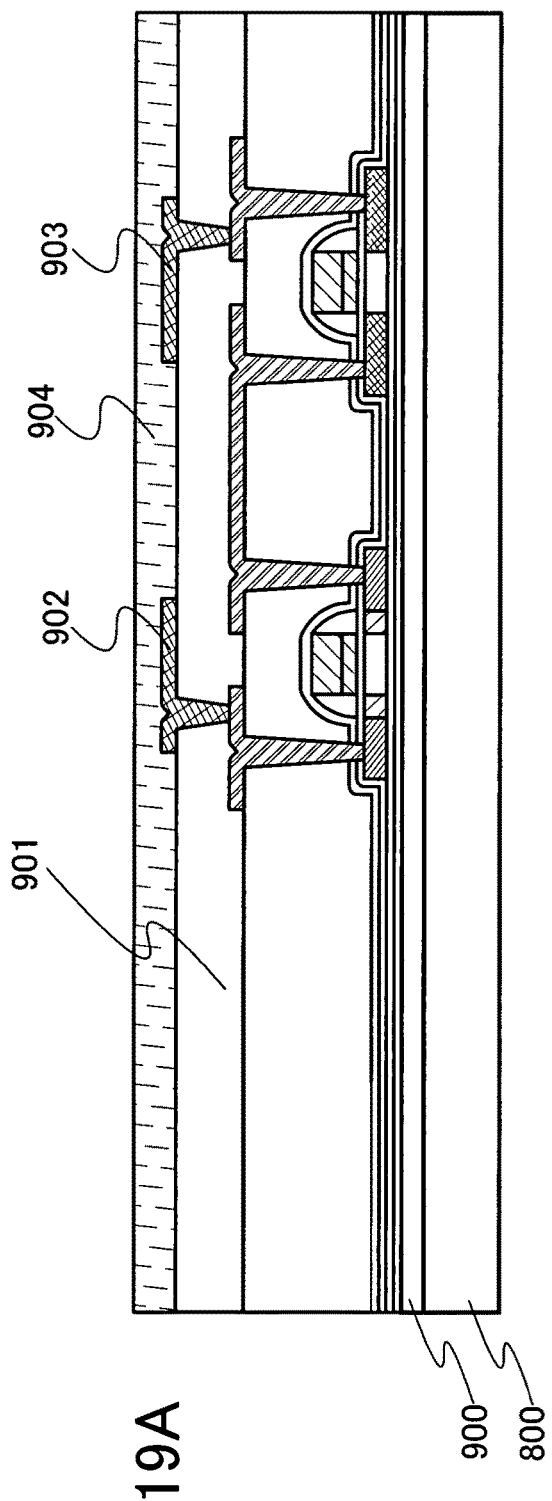
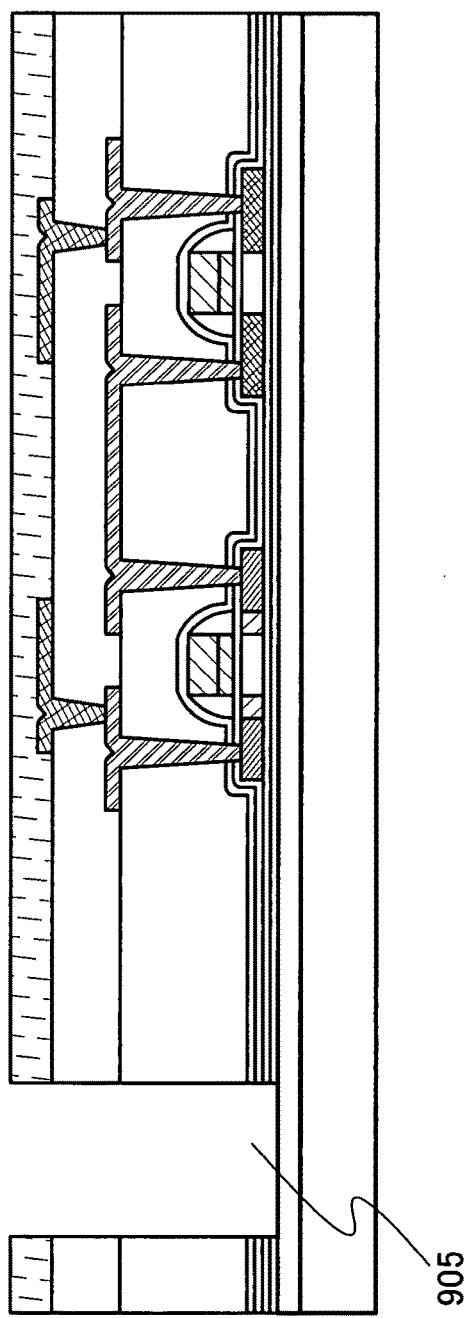

ELECTRONIC PEN AND ELECTRONIC PEN SYSTEM

BACKGROUND OF THE INVENTION

1. Field of the Invention

The present invention relates to a writing instrument by which a character or the like is written on a display portion, and a technique which digitizes information written with the writing instrument.

2. Description of the Related Art

Conventionally, in using a whiteboard at a meeting or the like, the content written down on the whiteboard by a writer with a whiteboard marker is stored in such a way that information written down on the whiteboard is read by an image sensor such as a scanner mounted on the whiteboard and is printed on recording paper. Further, in the case where the information written down on the whiteboard is shared by multiple people, a copy of the recording paper is distributed to each person.

Since the method of storing information written down on a conventional whiteboard is limited to making a hard copy on recording paper only, there is a problem in that long-term storage of the information is difficult due to wear and tear or the like of the recording paper. In addition, in the case where the information is desired to be shared by multiple people, a copy of the recording paper needs to be distributed to each person, which is troublesome and makes it difficult to share the information at the same time with a person at a remote location. A method of reading and digitizing the hard copy as image data with an image sensor so as to share the information is conceivable; however, there is a problem in that image quality is degraded because another reading is conducted.

Further, since the information cannot be stored without writing on the whiteboard mounted with an image sensor, even for a meeting with a small number of people, they have to take the trouble to move to a meeting room or the like where a whiteboard mounted with an image sensor is equipped, which is inconvenient.

In such a situation, a technique of using a CCD sensor to obtain an image of information written down on paper with a pen and digitizing the obtained image data to be stored in a memory device mounted on the pen is proposed (For example, Patent Document 1: Japanese Published Patent Application No. H8-30370).

SUMMARY OF THE INVENTION

However, in the electronic pen of Patent Document 1, in the case where one character is made up of plural image data, the position of the plural image data is determined in the following manner: image data which partially match each other are considered as one character and then are synthesized, and image data which do not match each other are considered as separate characters. Therefore, when one character is larger than the image data that can be taken at one time, it is hard to grasp the precise positional relation of plural image data, and the correct information may not be obtained.

In the electronic pen of Patent Document 1, a power supply for driving a circuit is rechargeable. Conventionally, since electric power is supplied from commercial power for charging, each user connects an AC adapter to an outlet provided in each home in order to charge the power supply. Accordingly, the user must pay attention to the remaining amount of power of the power supply and has to always be concerned with the time until the next charge is needed. Moreover, a conventional battery for charging is too big and heavy to carry around. In such a case where the conventional battery is provided for a pen or the like, miniaturization and reduction in weight are prevented and the pen is hard to be used as an ordinary pen.

In consideration of the above-described problems, it is an object of the present invention to provide a small and light-weight writing instrument by which information written in a display portion can be accurately read as electronic information without using an image sensor.

The electronic pen of the present invention includes a battery which can be charged wirelessly from the outside, a sensor which detects information written down with a pen, and a memory which stores the information written down with the pen. Note that the sensor and the memory operate by supply of electric power from the battery. Further, a device which transmits an electromagnetic wave for charging the battery can be provided in a display portion or the like on which a character or the like is written down with the pen. Note that a sensor for reading the information written down with the pen may also be provided in the display portion.

A feature of an electronic pen of the present invention is to include a battery which can be charged wirelessly from the outside, a first sensor which detects whether a pen nib has contact with a surface, a second sensor which detects movement of the pen nib in contact with the surface, a control circuit which is electrically connected to the first sensor and the second sensor, and a memory which is electrically connected to the control circuit, in which the first sensor, the second sensor, the control circuit, and the memory operate by supply of electric power from the battery. According to the present invention, the surface may be any type of surface, as long as the first sensor is able to detect that contact is made with a surface. Examples of some surfaces may be paper, a hand, a desk, a board, a book, and the like.

A feature of the electronic pen of the present invention is that the battery is a lithium battery, a lithium polymer battery, a lithium ion battery, a nickel metal hydride battery, a nickel-cadmium battery, an organic radical battery, a lead-acid battery, an air secondary battery, a nickel-zinc battery, a silver-zinc battery, or an electric double layer capacitor.

A feature of the electronic pen of the present invention is that the battery is electrically connected to a constant current source circuit and a switch circuit, and depending on a charge state of the battery, the battery is electrically connected to a charge control circuit which controls the switch circuit.

A feature of the electronic pen of the present invention is that the battery is electrically connected to a remaining amount detection circuit which detects a remaining amount of the battery and a modulation circuit which modulates output of the remaining amount detection circuit.

A feature of the electronic pen of the present invention is that the first sensor is a light sensor, a pressure sensor, or an RFID chip.

A feature of the electronic pen of the present invention is that the second sensor is a motion sensor.

A feature of the electronic pen of the present invention is that the motion sensor is an acceleration sensor or an angular rate sensor.

A feature of an electronic pen system is to include an electronic pen including a battery which can be charged wirelessly from the outside, a first sensor which detects whether a pen nib has contact with a surface, a second sensor which detects movement of the pen nib in contact with the surface, a control circuit which is electrically connected to the first sensor and the second sensor, and a memory which is electrically connected to the control circuit. The electronic pen system also includes a display portion including an antenna which transmits an electromagnetic wave for charging the battery. The first sensor, the second sensor, the control circuit, and the memory operate by supply of electric power from the battery.

A feature of an electronic pen system is to include an electronic pen including a battery which can be charged wirelessly from the outside, a first sensor, a control circuit electrically connected to the first sensor, and a memory which is electrically connected to the control circuit. The electronic pen system also includes a display portion including an antenna which transmits an electromagnetic wave for charging the battery and a second sensor. The first sensor, the control circuit, and the memory operate by supply of electric power from the battery.

A feature of the electronic pen system of the present invention is that the battery is a lithium battery, a lithium polymer battery, a lithium ion battery, a nickel metal hydride battery, a nickel-cadmium battery, an organic radical battery, a lead-acid battery, an air secondary battery, a nickel-zinc battery, a silver-zinc battery, or an electric double layer capacitor.

A feature of the electronic pen system of the present invention is that the battery is electrically connected to a constant current source circuit and a switch circuit, and depending on a charge state of the battery, the battery is electrically connected to a charge control circuit which controls the switch circuit.

A feature of the electronic pen system of the present invention is that the battery is electrically connected to a remaining amount detection circuit which detects a remaining amount of the battery and a modulation circuit which modulates output of the remaining amount detection circuit.

A feature of the electronic pen system of the present invention is that the first sensor is a light sensor, a pressure sensor, or an RFID chip.

By the present invention, it is possible to provide a writing instrument which can accurately read information written in a display portion as electronic information without using an image sensor and which can store the electronic information. Further, since the writing instrument is wirelessly supplied with an electric power from the outside to charge a battery and perform a circuit operation, the writing instrument which does not need a replacement of a cell can be provided. Further, since charging is conducted wirelessly, the battery can be charged even when the pen is in use, which removes the need for a large rechargeable battery and enables a small and light-weight writing instrument to be provided.

BRIEF DESCRIPTION OF DRAWINGS

In the accompanying drawings:
FIGS. 19A and 19B are conceptual diagrams for explaining the present invention.

DETAILED DESCRIPTION OF THE INVENTION

Figure 1:
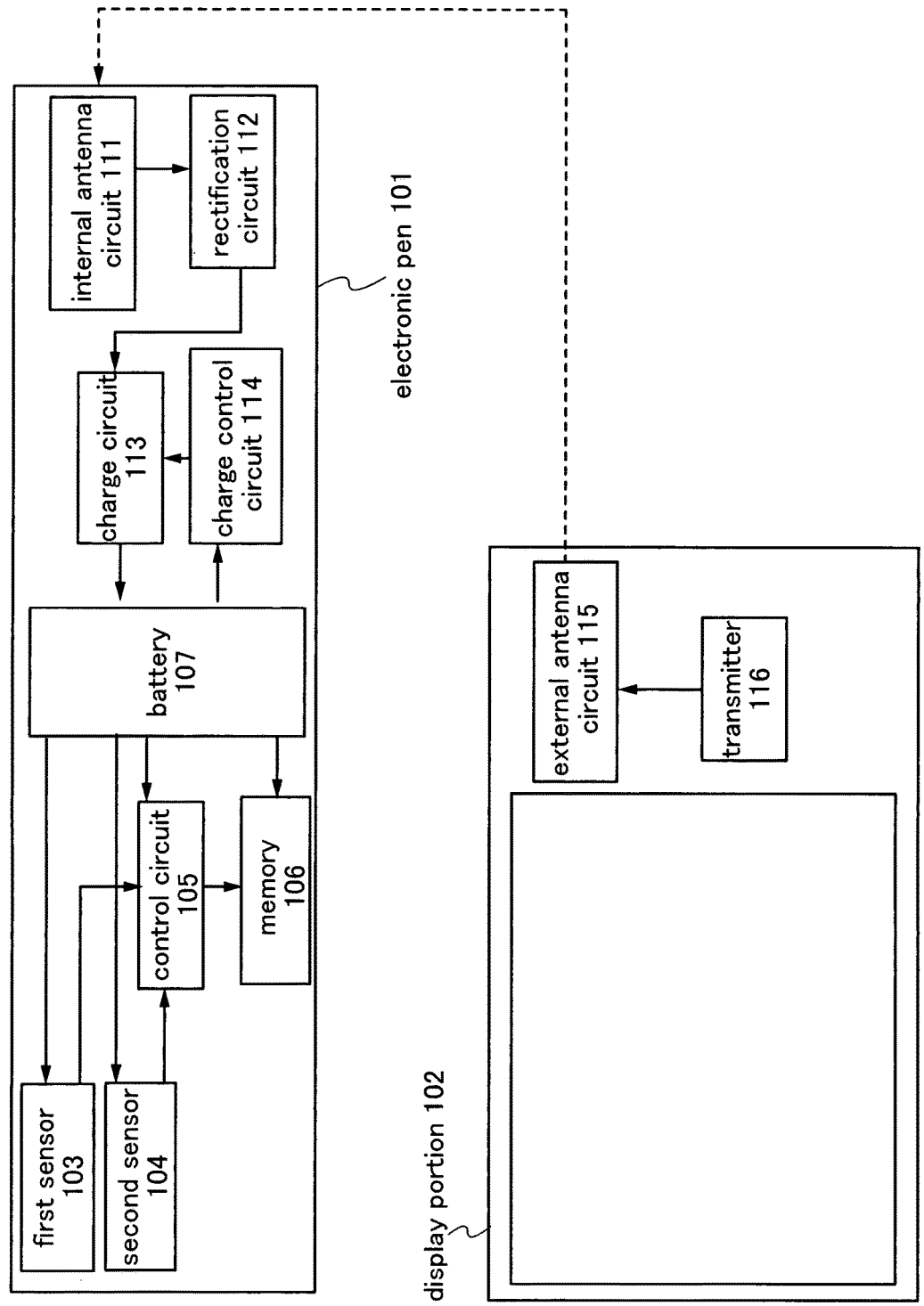
FIG. 1 is a conceptual diagram for explaining the present invention.

Embodiment modes of the present invention will be described in detail with reference to the drawings. It is easily understood by those skilled in the art that various changes may be made in forms and details without departing from the spirit and the scope of the invention. Therefore, the present invention should not be limited to the descriptions of the embodiment modes below. In addition, in the following structures of the present invention, the same reference numerals are commonly given to the same components or components having a similar function throughout the drawings, and repetitive explanation is omitted.

In this specification, an RF battery or a wireless battery is the one that includes an antenna, a circuit for charging a battery with electromotive force generated by an electromagnetic wave that is received by the antenna, and a medium for storing the electromotive force.

Embodiment Mode 1

Embodiment Mode 1 will describe a structure of a writing instrument which can read information written in a display portion such as a whiteboard as electronic data.

The writing instrument of the present invention will be described with reference to FIG. 1. FIG. 1 shows an embodiment mode of an electronic pen 101 and a display portion 102 as writing instruments according to Embodiment Mode 1. The electronic pen 101 includes a first sensor 103, a second sensor 104, a control circuit 105, a memory 106, a battery 107, an internal antenna circuit 111, a rectification circuit 112, a charge circuit 113, and a charge control circuit 114. In addition, the display portion 102 includes an external antenna circuit 115 and a transmitter 116.

An output terminal of the internal antenna circuit 111 is electrically connected to an input terminal of the rectification circuit 112, an output terminal of the rectification circuit 112 is electrically connected to an input terminal of the charge circuit 113, and an output terminal of the charge circuit 113 is electrically connected to an input terminal of the battery 107. A terminal for power supply of the battery 107 is connected to the first sensor 103, the second sensor 104, the control circuit 105, and the memory 106. In addition, the first sensor 103, the second sensor 104, and the memory 106 are electrically connected to the control circuit 105. The charge control circuit 114 is electrically connected to the charge circuit 113.

Note that "battery" in this specification means a secondary battery whose continuous operating time can be restored by charging. Further, as a battery, a battery formed in a sheet-like form with a small thickness or a battery formed in a cylindrical shape with a small diameter is preferably used although the type of the battery may differ depending on the intended use of the device. For example, by using a lithium battery, preferably a lithium polymer battery that uses a gel electrolyte, a lithium ion battery, or the like, miniaturization is possible. Needless to say, any battery may be used as long as it is chargeable. For example, the following batteries that are chargeable and dischargeable can be used: a nickel metal hydride battery, a nickel cadmium-battery, an organic radical battery, a lead-acid battery, an air secondary battery, a nickel-zinc battery, a silver-zinc battery, or the like. Alternatively, a high-capacity capacitor or the like may be used.

Note that as a high-capacity capacitor that can be used as a battery of this embodiment mode, it is preferable to use a capacitor having electrodes with large opposed areas. In particular, it is preferable to use an electric double layer capacitor which is formed using an electrode material having a large specific surface area such as activated carbon, fullerene, or a carbon nanotube. A capacitor has a simpler structure than a battery and can be easily formed to be thin and formed by stacking layers. An electric double layer capacitor has a function of storing electric power and does not deteriorate much even after it is charged and discharged a number of times. Further, an excellent property of the electric double layer capacitor is that it can be charged rapidly.

The first sensor 103 and the second sensor 104 detect information such as a character written in the display portion 102 with the electronic pen 101 and input data of the information such as the character to the memory 106 through the control circuit 105.

Here, the first sensor 103 is a sensor which detects whether a pen nib of the electronic pen 101 is in contact with a surface of the display portion 102. As the first sensor 103, a light sensor, a pressure sensor, or an RFID chip can be used, for example.

Further, the second sensor 104 is a sensor which detects movement of the pen nib of the electronic pen 101. As the second sensor 104, a motion sensor or the like can be used, for example. It is preferable to employ a structure where the second sensor 104 operates only when the pen 101 is in contact with the display portion 102, using the first sensor 103.

Note that for the pressure sensor or the motion sensor, a micro electro mechanical system (MEMS) can be used, for example. By using a sensor manufactured by a MEMS technology, a small and light-weight electronic pen can be manufactured.

In this embodiment mode, data stored in the memory 106 is transmitted to the display portion 102 and is analyzed by a CPU which is provided in the display portion 102. Note that the system for analyzing the data stored in the memory may be provided in a portion other than the display portion. Further the memory 106 may be detachable so that only the memory portion is portable, and the memory 106 may be directly connected to a computer or the like so that the computer or the like can read in the data.

In this embodiment mode, the first sensor 103, the second sensor 104, the control circuit 105, and the memory 106 are electrically connected to the battery 107 and the battery 107 supplies electric power thereto. Note that the battery 107 is charged with electric power which is wirelessly transmitted from the external antenna circuit 115 and the transmitter 116, which are provided in the display portion 102.

In FIG. 1, the internal antenna circuit 111 receives a wireless signal generated by the external antenna circuit 115. The signal received by the internal antenna circuit 111 is input to the rectification circuit 112 and the signal is converted into a DC signal. The charge circuit 113 generates current from the electric power of the rectification circuit 112 and charges the battery. The charge control circuit 114 monitors the battery 107 so that the battery 107 is not overcharged. When the charge amount is too large, the charge control circuit 114 controls the charge circuit 113 to suppress the charge amount. Note that the charge circuit 113 can be formed, including a voltage control circuit (also referred to as a regulator) and a switch circuit, for example. A structure where the charge control circuit is omitted by using a diode as the switch circuit may be employed. A voltage and current control circuit or a constant current source circuit may be substituted for the voltage control circuit.

Figure 15A:
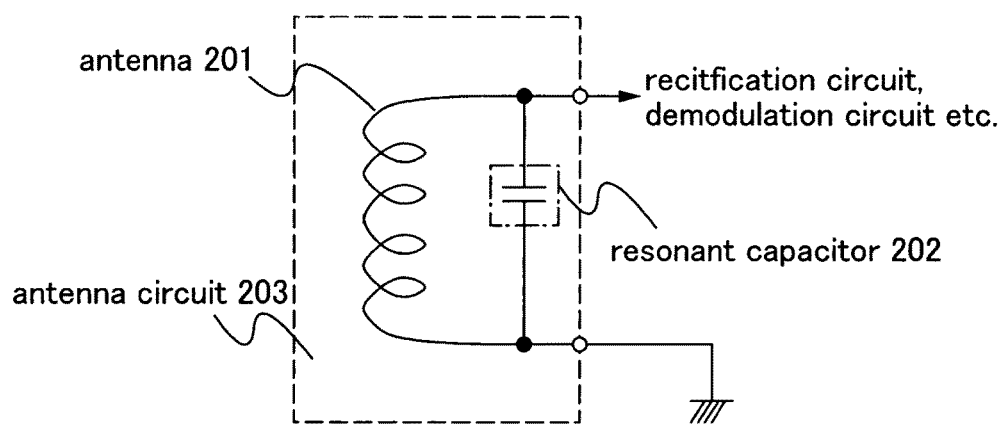
FIGS. 15A and 15B are conceptual diagrams for explaining the present invention.
Figure 15B:
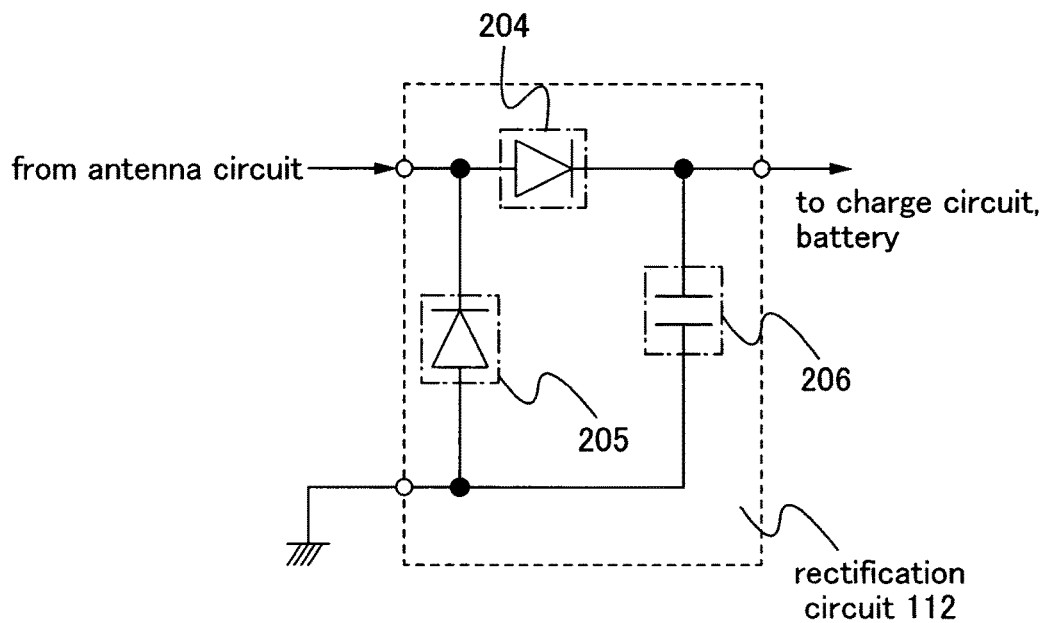

As the internal antenna circuit 111 and the external antenna circuit 115, for example, an antenna circuit 203 including an antenna 201 and a resonant capacitor 202 as shown in FIG. 15A can be used. In addition, the rectification circuit 112 may be any circuit as long as it converts an AC signal into a DC signal, in which the AC signal is induced by an electromagnetic wave received by the internal antenna circuit 111 and the external antenna circuit 115. For example, as shown in FIG. 15B, the rectification circuit 112 can include a diode 204, a diode 205, and a smoothing capacitor 206.

Figure 2A:
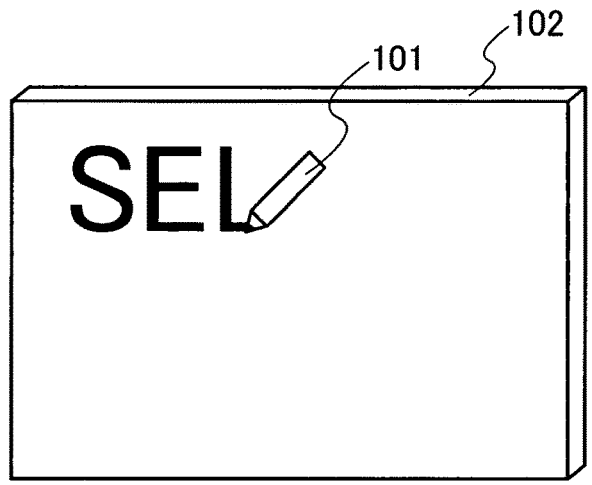
FIGS. 2A and 2B are conceptual diagrams for explaining the present invention.
Figure 2B:
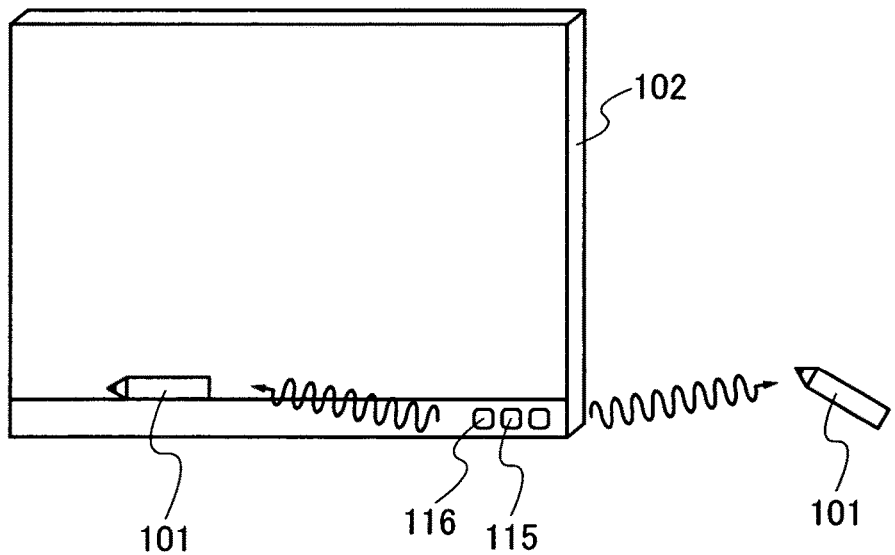

FIGS. 2A and 2B are schematic diagrams of a usage mode. Upon writing character information in the display portion 102 with the use of the electronic pen 101 as shown in FIG. 2A, the sensors provided in the electronic pen 101 detect movement and contact of the electronic pen. A program for obtaining character information from the information is executed in an arithmetic circuit, and the character information can be stored in a memory as electronic information. As shown in FIG. 2B, the transmitter 116 provided in the display portion 102 generates a wireless electromagnetic wave through the external antenna circuit 115. By reception of the wireless electromagnetic wave, the electronic pen 101 can use the wireless electromagnetic wave as operating power. Note that a battery charger including an external antenna and a transmitter circuit may be positioned so as to charge the electronic pen while writing or may be positioned so as to conduct charging with the electronic pen being fixed to the battery charger. For example, the battery charger may be incorporated in a pen tray provided in the display portion, or a portable pen tray in which the battery charger is incorporated may be prepared separately. In the case of employing a portable battery charger, it is preferable to employ a structure where the battery charger can be fixed to a display portion with a hook or the like.

Figure 3A:
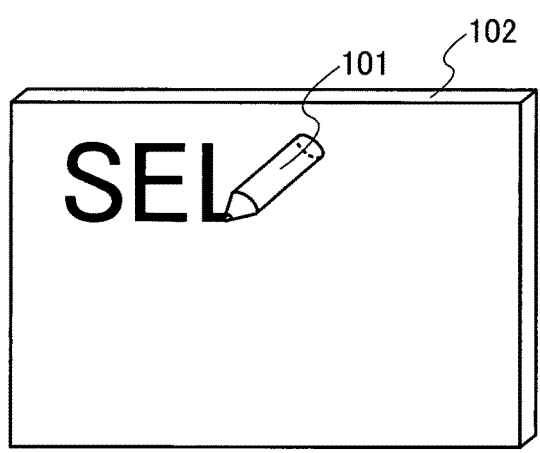
FIGS. 3A to 3C are conceptual diagrams for explaining the present invention.
Figure 3B:
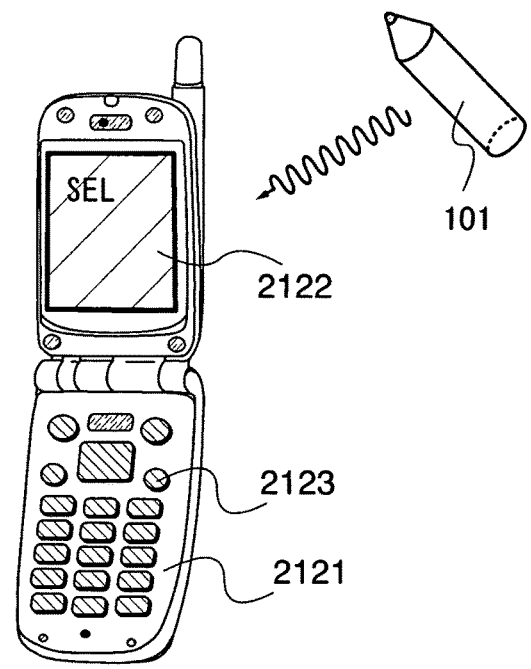
Figure 3C:
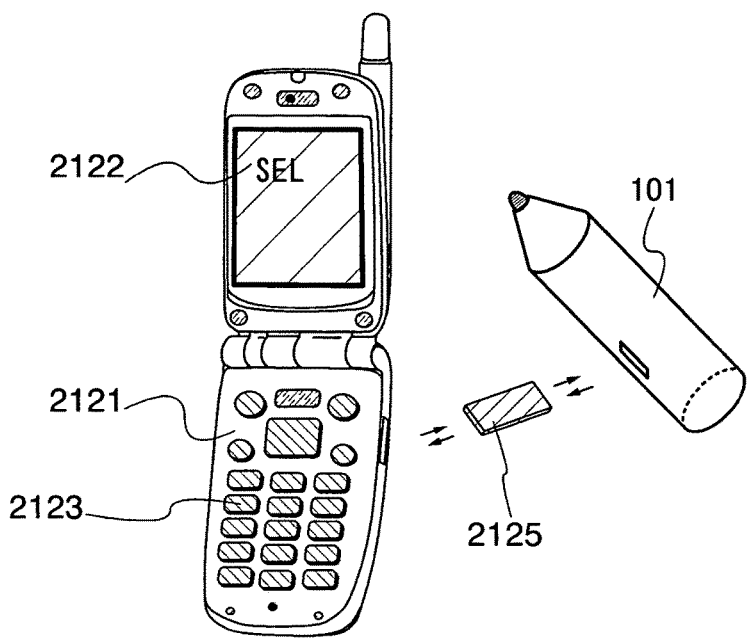

Further, a structure where data stored in an electronic pen is transmitted to an information terminal such as a cellular phone so as to be displayed may be employed. For example, as shown in FIG. 3A, data of character information written in the display portion 102 is stored in the electronic pen 101. Then, by transmitting the data stored in the electronic pen 101 to a cellular phone, the data stored in the electronic pen can be displayed in a display portion 2122 of the cellular phone as character information as shown in FIG. 3B. The memory mounted on the electronic pen may be detachable, and FIG. 3C shows a mode in the case of mounting a detachable memory. As shown in FIG. 3C, when a memory 2125 mounted on the electronic pen 101 is inserted into the cellular phone, data of character information written down with the electronic pen can be read and displayed on the display portion 2122 of the cellular phone. The cellular phone shown in FIGS. 3B and 3C is only an example of the portable information terminal, and it includes a frame 2121, the display portion 2122, operation keys 2123, and the like.

In this embodiment mode, a frequency of a wireless signal received by the internal antenna circuit 111 may be, for example, 125 kHz, 13.56 MHz, 915 MHz, 2.45 GHz, or the like. However, the frequency of the signal received by the internal antenna circuit is not limited to these, and for example, any of the following can be employed: a submillimeter wave of greater than or equal to 300 GHz and less than or equal to 3 THz; an extra high frequency of greater than or equal to 30 GHz and less than 300 GHz; a super high frequency of greater than or equal to 3 GHz and less than 30 GHz; an ultra high frequency of greater than or equal to 300 MHz and less than 3 GHz; a very high frequency of greater than or equal to 30 MHz and less than 300 MHz; a high frequency of greater than or equal to 3 MHz and less than 30 MHz; a medium frequency of greater than or equal to 300 KHz and less than 3 MHz; a low frequency of greater than or equal to 30 KHz and less than 300 KHz; and a very low frequency of greater than or equal to 3 KHz and less than 30 KHz. Further, a signal transmitted or received between the internal antenna circuit and the external antenna circuit is a modulated carrier wave. As a method of modulating the carrier wave, analog modulation or digital modulation may be used. Amplitude modulation, phase modulation, frequency modulation, or spread spectrum may also be used. Preferably, amplitude modulation or frequency modulation is used. For example, as the wireless signal, electric waves that are unintentionally received from the outside such as electric waves of relay stations of cellular phones (e.g., 800 to 900 MHz, 1.5 GHz, or 1.9 to 2.1 GHz), electric waves emitted from cellular phones, electric waves of wave clocks (e.g., 40 kHz), noise of a household AC power supply (e.g., 60 Hz), or the like can also be utilized. Further, by provision of a plurality of antenna circuits each of which uses an antenna with different length and shape as the internal antenna circuit 111, various wireless signals can be utilized for charging the battery 107.

The length and shape of the antenna provided in the internal antenna circuit and the external antenna circuit are decided so as to easily receive these wireless signals. In addition, the shape of the antenna is set in consideration of handling ease as a pen. Further, in the case of receiving a plurality of these electric waves, it is preferable to provide a plurality of antenna circuits each of which includes an antenna with different length and shape.

The shape of the antenna provided in the internal antenna circuit 111 or the external antenna circuit 115 is not particularly limited. That is, as a transmission system of a signal that is applied to the internal antenna circuit 111 or the external antenna circuit 115, an electromagnetic coupling system, an electromagnetic induction system, a micro-wave system, or the like can be used. The transmission system may be selected appropriately by a practitioner in consideration of usage, and an antenna having an optimal length and shape may be provided in accordance with the transmission system.

In the case of employing, for example, an electromagnetic coupling system or an electromagnetic induction system (e.g., 13.56 MHz band) as the transmission system, electromagnetic induction caused by a change in electric field density is used. Therefore, the conductive film which functions as an antenna is formed in an annular shape (e.g., a loop antenna) or a spiral shape (e.g., a spiral antenna or a helical antenna).

A micro-wave system (e.g., UHF band (860 to 960 MHz band), a 2.45 GHz band, or the like) can be used as the transmission system. In that case, the length and shape of the conductive film which functions as an antenna may be appropriately set in consideration of the wavelength of an electric wave used for signal transmission. For example, a conductive film which functions as an antenna can be formed in a linear shape (e.g., a dipole antenna), a flat shape (e.g., a patch antenna), or the like. The shape of the conductive film which functions as the antenna is not limited to a linear shape, and a curved-line shape, a meander shape, or a combination thereof may be employed in consideration of the wavelength of an electromagnetic wave.

The shape of the antenna needs to be determined in consideration of handling ease as a pen. For example, in the case of providing a dipole antenna in a length direction of the pen, an electric wave parallel to the length direction of the pen may be transmitted. Further, when an antenna having an annular shape or a spiral shape is used and a coil for forming the antenna is arranged to twine around a pen barrel, a signal may be generated from a battery charger so that a magnetic flux flows in a length direction of the pen.

Figure 16A:
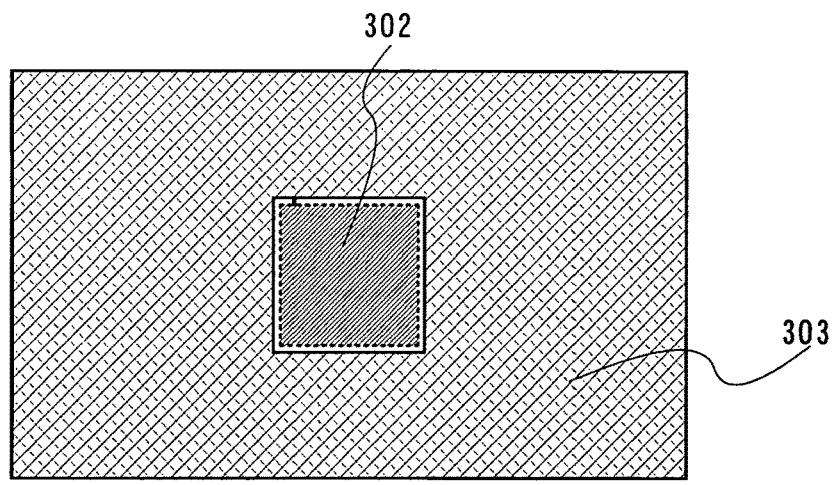
FIGS. 16A to 16E are conceptual diagrams for explaining the present invention.
Figure 16B:
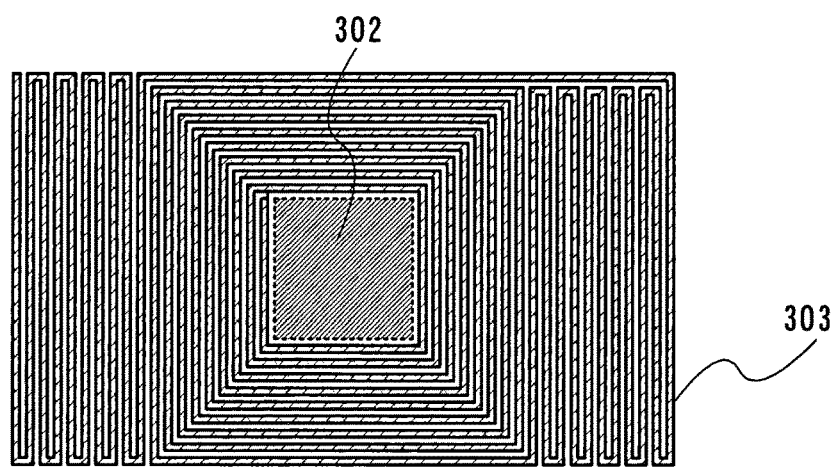
Figure 16C:
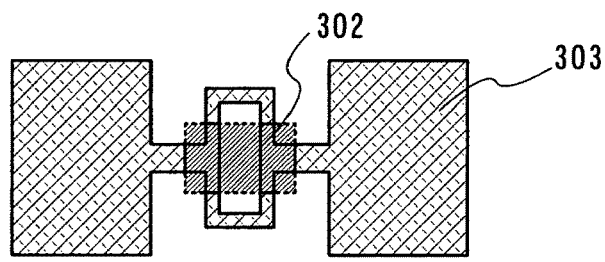
Figure 16D:
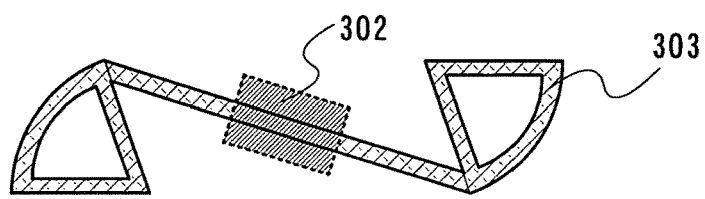
Figure 16E:
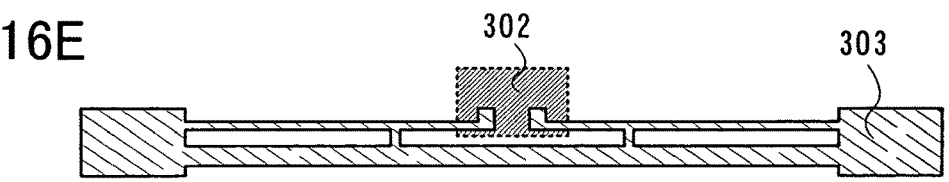

Here, examples of the shape of the antenna provided in the internal antenna circuit 111 or the external antenna circuit 115 are shown in FIGS. 16A to 16E. For example, as shown in FIG. 16A, a structure in which an antenna 303, which is sheet-shaped, is provided around a substrate 302 over which a circuit or the like is provided may be used. In addition, as shown in FIG. 16B, a structure in which the antenna 303, which is thin, is provided around the substrate 302 over which a circuit or the like is provided may be used. Further, the shape of the antenna 303 for receiving a high frequency electromagnetic wave, as shown in FIG. 16C, may be used and provided for the substrate 302 over which a circuit or the like is provided. In addition, as shown in FIG. 16D, the antenna 303, which is 180 degree omnidirectional (capable of receiving signals equally from any directions), may be provided for the substrate 302 over which a circuit or the like is provided. In addition, as shown in FIG. 16E, the antenna 303 which is extended in a stick like shape may be provided for the substrate 302 over which a circuit or the like is provided. The internal antenna circuit 111 and the external antenna circuit 115 can be formed by a combination of antennas having shapes such as these.

In FIGS. 16A to 16E, there is no limitation on the connection between the substrate 302 over which a circuit or the like is provided and the antenna 303. For example, the antenna 303 and the substrate 302 over which a circuit or the like is provided may be connected by wire bonding or bump bonding. Alternatively, an electrode formed in a portion of the substrate 302 over which a circuit or the like is provided may be attached to the antenna 303; in this method, an ACF (anisotropic conductive film) can be used for the attachment. An appropriate length of the antenna varies depending on a frequency for receiving signals. For example, when the frequency is 2.45 GHz, in the case of providing a half-wave dipole antenna, the length of the antenna may be a half wavelength (about 60 mm), and in the case of providing a monopole antenna, the length may be a quarter wavelength (about 30 mm).

Figure 17:
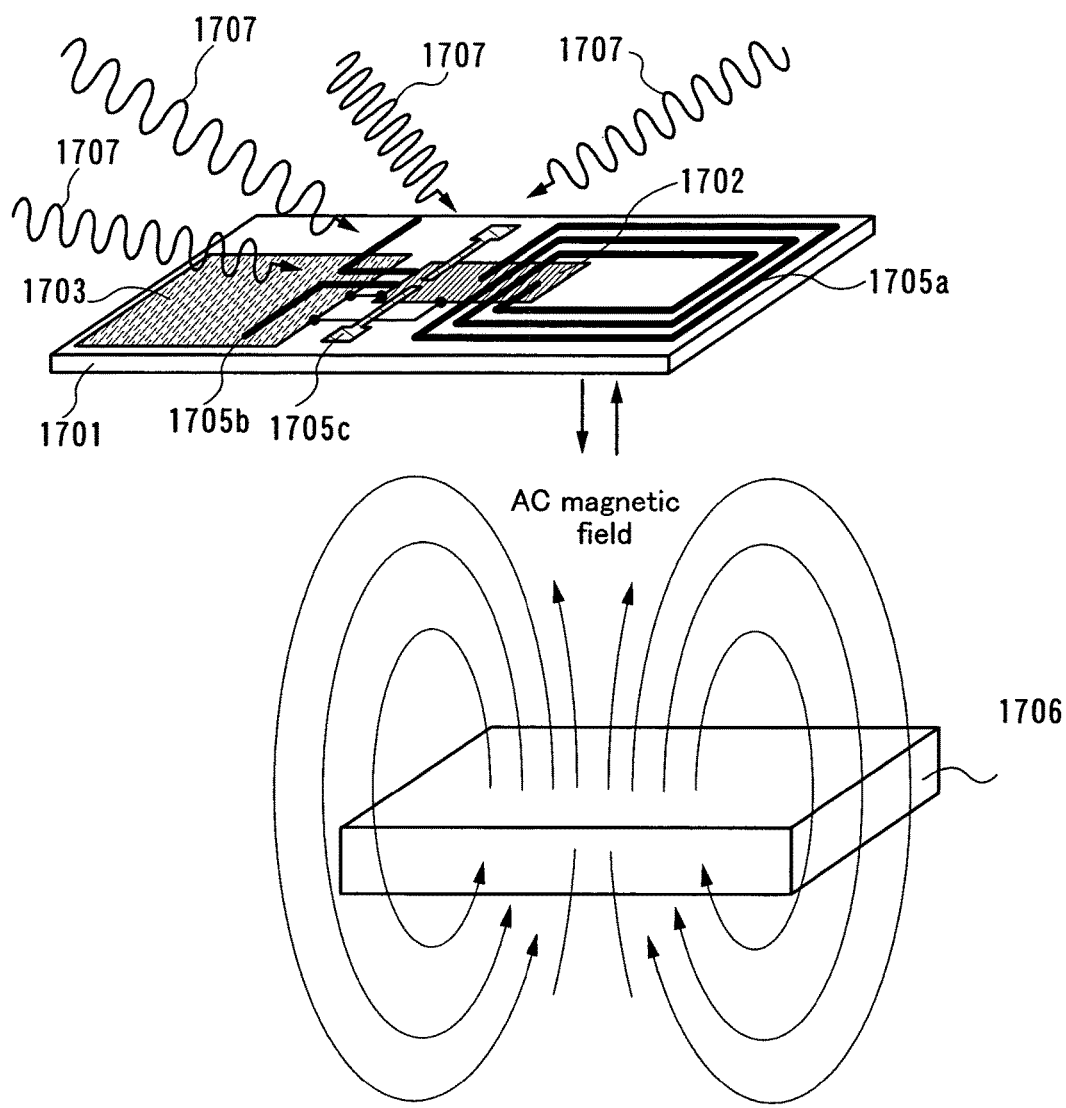
FIG. 17 is a conceptual diagram for explaining the present invention.

The internal antenna circuit provided in the electronic pen may have a multiband antenna structure, by which electromagnetic waves in a plurality of frequency bands can be received. For example, as shown in FIG. 17, the internal antenna circuit may be formed of a plurality of antenna circuits. In the structure shown in FIG. 17, a first antenna circuit 1705a, a second antenna circuit 1705b, a third antenna circuit 1705c, a chip 1702 including a control circuit, and a battery 1703 are provided over a substrate 1701. Note that the first antenna circuit 1705a, the second antenna circuit 1705b, and the third antenna circuit 1705c are electrically connected to the control circuit provided in the chip 1702. Reference numeral 1706 denotes a transmitter which transmits an electromagnetic wave for charging the battery and is provided in a display portion or the like.

The electric waves received by the first antenna circuit 1705a, the second antenna circuit 1705b, and the third antenna circuit 1705c are input to the battery 1703 through a rectification circuit in the control circuit formed in the chip 1702, thereby charging the battery 1703.

Here, an example where the electric wave transmitted from the transmitter 1706 is received by the first antenna circuit 1705a and an external wireless signal 1707 is received by the second antenna circuit 1705b and the third antenna circuit 1705c is shown. Further, a relation of connection among the first antenna circuit 1705a, the second antenna circuit 1705b, and the third antenna circuit 1705c is not particularly limited. For example, all antennas may be electrically connected, or alternatively antennas may be provided independently without being electrically connected.

The lengths and shapes of the first antenna circuit 1705a, the second antenna circuit 1705b, and the third antenna circuit 1705c used for charging the battery 1703 are not limited to those shown in FIG. 17. Here, an example is shown, in which linear antennas having different lengths (dipole antennas) are provided as antennas of the second antenna circuit 1705b and the third antenna circuit 1705c. Alternatively, for example, a combination of a dipole antenna and a coiled antenna or a combination of a dipole antenna and a patch antenna may be used. Thus, a plurality of antennas having different lengths and shapes can be provided as the antennas used for charging the battery 1703, whereby various wireless signals can be received. Accordingly, charging efficiency can be improved. In particular, when a combination of antennas having different shapes such as a combination of a patch antenna and a dipole antenna is provided (for example, a folded dipole antenna is provided around a patch antenna), it becomes possible to utilize a limited space efficiently. The example of providing three antenna circuits of the first antenna circuit 1705a, the second antenna circuit 1705b, and the third antenna circuit 1705c in the electronic pen is shown in this embodiment mode; however, the present invention is not limited to this. A structure where one antenna circuit, two antenna circuits, or four or more antenna circuits is/are provided may be employed.

For example, the frequency of signals transmitted and received between the first antenna circuit 1705a and the transmitter 1706 may be 125 kHz, 13.56 MHz, 915 MHz, 2.45 GHz, or the like, to each of which a standard of the ISO is applied. However, the frequency of the signals transmitted and received between the first antenna circuit 1705a and the transmitter 1706 is not limited to this, and for example, any of the following can be employed: a submillimeter wave of greater than or equal to 300 GHz and less than or equal to 3 THz; an extra high frequency of greater than or equal to 30 GHz and less than 300 GHz; a super high frequency of greater than or equal to 3 GHz and less than 30 GHz; an ultra high frequency of greater than or equal to 300 MHz and less than 3 GHz; a very high frequency of greater than or equal to 30 MHz and less than 300 MHz; a high frequency of greater than or equal to 3 MHz and less than 30 MHz; a medium frequency of greater than or equal to 300 KHz and less than 3 MHz; a low frequency of greater than or equal to 30 KHz and less than 300 KHz; and a very low frequency of greater than or equal to 3 KHz and less than 30 KHz. The signal transmitted and received between the first antenna circuit 1705a and the transmitter 1706 is a modulated carrier wave. As a method of modulating the carrier wave, analog modulation or digital modulation may be used: amplitude modulation, phase modulation, frequency modulation, or spread spectrum may also be used. Preferably, amplitude modulation or frequency modulation is used.

As the external wireless signal 1707 received by the antennas of the second antenna circuit 1705b and the third antenna circuit 1705c, electric waves of relay stations of cellular phones (e.g., 800 to 900 MHz, 1.5 GHz, or 1.9 to 2.1 GHz), electric waves emitted from cellular phones, electric waves of wave clocks (e.g., 40 kHz), noise of a household AC power supply (e.g., 60 Hz), electric waves generated unintentionally from other readers/writers, or the like can also be utilized. When the battery is charged wirelessly by reception of external wireless signals, a battery charger or the like for charging the battery is not needed additionally; accordingly, the electronic pen can be manufactured at reduced cost. Further, by provision of a plurality of antenna circuits each of which uses an antenna with different length and shape as shown in FIG. 17, various wireless signals can be utilized for charging the battery 1703. The lengths and shapes of the antennas provided in the second antenna circuit 1705b and the third antenna circuit 1705c are preferably decided so as to easily receive these wireless signals. Further, the mode where the first antenna circuit 1705a receives the electromagnetic wave from the transmitter 1706 is used in FIG. 17; however, the present invention is not limited to this and a mode where all antenna circuits receive external wireless signals for charging the battery may be employed.

The example of providing the plurality of antenna circuits 1705a, 1705b, and 1705c, the chip 1702, and the battery 1703 over the one substrate 1701 is shown in FIG. 17; however, the present invention is not limited to the structure shown in FIG. 17, and each of them may be provided over a separate substrate.

The electronic pen shown in this embodiment mode can accurately read information written down on a display portion as electronic information without using an image sensor and store the electronic information. Further, since the electronic pen described in this embodiment mode receives electric power wirelessly from the outside and stores the electric power in a battery for carrying out a circuit operation, change of the battery is not needed. In addition, since charging is conducted wirelessly, the pen can be charged while being used, and a large-sized rechargeable battery is not needed. Accordingly, a small and light-weight writing instrument can be provided.

Embodiment Mode 2

Embodiment Mode 2 will describe a structure of an electronic pen described in the above embodiment mode, with reference to the drawings.

Figure 4:
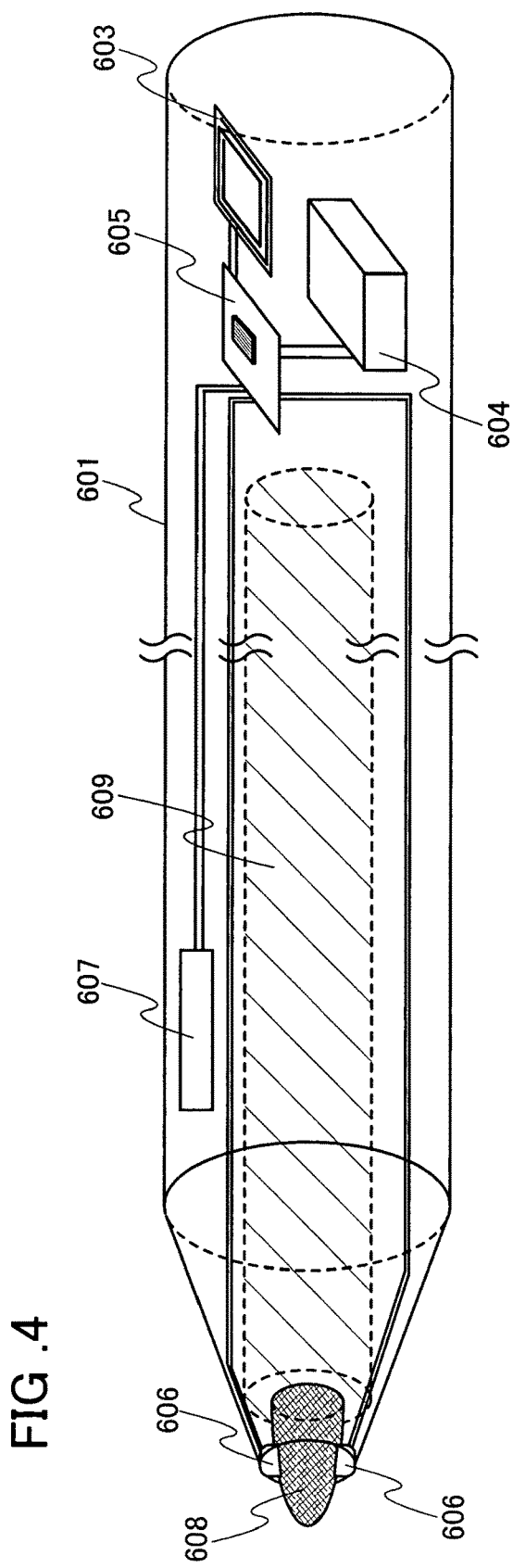
FIG. 4 is a conceptual diagram for explaining the present invention.

In this embodiment mode, an electronic pen includes a body 601, an internal antenna 603, a battery 604, a circuit substrate 605, a first sensor 606, a second sensor 607, a pen nib 608, and a pen barrel 609 (FIG. 4). Note that the internal antenna 603, the battery 604, the circuit substrate 605, the first sensor 606, and the second sensor 607 are electrically connected with wires. Since the electronic pen of this embodiment mode wirelessly obtains electric power, in the case of providing the internal antenna inside the electronic pen, an electromagnetic wave needs to reach the inside of the electronic pen. In that case, the body 601 is preferably formed using an insulator which allows electromagnetic waves to pass. For example, the body 601 can be formed using a resin. Further, if a loop antenna is used as the internal antenna, electromagnetic waves can be easily received. Note that the internal antenna is not necessarily provided inside the body 601 and may be provided so as to be attached to an outside portion of the body 601. In that case, the material of the body 601 is not particularly limited.

The internal antenna 603 has a size for receiving a necessary amount of electric power, and the size is desirably greater than or equal to 1 cm square. As the battery 604, one that can ensure long-term reliability is preferable and a lithium ion secondary battery is desirable. However, the battery 604 is not limited to the lithium ion secondary battery. An LSI in which a memory, a control circuit, a rectification circuit, a charge circuit, and the like are integrated, accessories thereof, and the like are mounted on the circuit substrate 605. The circuit substrate 605 is made of a printed board and formed of an epoxy resin or the like. It is desirable that the LSI reduces the package size to diminish the installation area using a chip-size packaging technology or a multi-chip packaging technology.

The first sensor 606 is a sensor which detects whether the pen nib is in contact with a display portion. FIG. 4 shows an example of using a light sensor for the first sensor 606. In the case of using a light sensor, the light sensor is mounted on a pen nib and senses writing when a character is written and thereby light is blocked. In the case where the light sensor is used and provided at a tip of the pen, a character or the like cannot be written. Therefore, a plurality of light sensors is provided at a peripheral part of the tip, and when at least one light sensor is shaded, writing is detected. Note that when a light sensor is provided in only one place, an angle of the pen cannot be accurately perceived and malfunction may be caused. By providing light sensors in about four to twenty places, whether the pen nib is in contact with the display portion can be accurately detected.

The first sensor 606 is not limited to the light sensor, and for example, a pressure sensor, a sensor using an RFID chip, or the like may be used.

In the case of using a pressure sensor for the first sensor 606 for example, the pressure sensor is mounted on a connecting portion of the pen nib 608 and the pen barrel 609. Thus, a structure where writing is detected when a character or the like is written and pressure is applied to the pen nib 608, can be formed. By using a MEMS micro pressure sensor for the pressure sensor, a small and light-weight electronic pen can be manufactured.

Further, in the case of using an RFID chip as the first sensor 606, antennas are provided on a surface (also referred to as a board) of a display portion, which can be written on, and of the pen. When the antenna on the display portion side generates an electromagnetic wave, the closer the distance between the antenna on the board and the antenna at the pen nib becomes, the higher the induced electromotive force generated from the antenna in the pen becomes; accordingly, contact between the pen and the board can be sensed.

In FIG. 4, the second sensor 607 is a sensor for detecting movement of the pen nib. As the second sensor 607, a triaxial acceleration sensor, a multiaxial acceleration sensor, or an angular rate sensor, which are MEMS motion sensors, can be used. The acceleration sensor is the one which measures acceleration of any of one directional axis to three directional axes from position change of an inertial body. The triaxial acceleration sensor can directly sense movement of the pen nib in three directional axes (X, Y, and Z directions).

For the acceleration sensor, an acceleration sensor such as a capacitance type acceleration sensor, a heat flow acceleration sensor, a piezoelectric acceleration sensor, or the like may be used for example. The capacitance type acceleration sensor can detect acceleration by detecting change in capacitance. A heat flow acceleration sensor includes a substrate, over which a heater and a temperature sensor are formed. Flow of air heated by the heater is changed by a tilt, and thus the acceleration sensor can detect the tilt. A temperature sensor and a heater can be spaced from a substrate by using a MEMS technology; accordingly, the tilt can be detected with high precision without dispersing heat to the Si substrate. The piezoelectric acceleration sensor is the one which utilizes a property of Si that the electric resistance value changes when being, bent. A weight is suspended from four points with bridges each provided with a piezoresistive element. When the weight moves, a load is applied to the piezoresistive elements, thereby changing a resistance; accordingly, the piezoelectric acceleration sensor can detect acceleration. In addition, the angular rate sensor is also called a gyro, and for example a ring which levitates or rotates by electrostatic attraction is changed by receiving an angular rate, and thus the angular rate sensor can detect an angular rate.

A MEMS motion sensor is smaller and more light-weight than a mechanical motion sensor and can detect small movement. Therefore, by mounting the MEMS motion sensor on the electronic pen of this embodiment mode, an electronic pen which is small, light-weight, and highly precise in position detection can be manufactured.

The positional information of the pen can be obtained in such a manner that for example, information about acceleration, time, and whether the pen nib is in contact with the board is detected several times to several hundreds of times a second, and the acceleration data is double-integrated over time to be converted into data of length (vector).

FIG. 4 shows an example of mounting a sensor which detects movement of the pen and a sensor which detects contact with the board on only the body of the electronic pen. However, in addition to these sensors provided in the electronic pen, a sensor which detects position where the pen is located on the board can be mounted on the display portion side. For example, when a pressure sensor or a capacitance sensor is highly integrated in a display portion, so that when a pen nib is in contact with the display portion, the sensor can detect the position of the pen. For example, by providing and highly integrating pressure sensors on the display portion side, when one of the sensors or a plurality of the sensors, which are in contact with each other, senses pressure, the sensor or sensors can detect that something is written on the board with the pen.

Further, an RFID chip may be highly integrated on the display portion. In this case, the structure is such that a mechanism for receiving a signal is provided in the electronic pen, and when the pen becomes close to the display portion, information of the relative position of the electronic pen on the display portion is transmitted from the display portion to the electronic pen. A slot antenna having high directivity and capable of being miniaturized to the size of millimeters is preferable for the antenna provided in the RFID chip, and the communication frequency becomes higher corresponding to the miniaturized antenna.

By providing a sensor which detects position information of the electronic pen on the display portion side, information of the relative position of the electronic pen on the display portion can be obtained. Accordingly, it is possible to know on which position on paper what character information is written down precisely. Note that in the case of providing a sensor for detecting positional information on the display portion side, the first sensor or the second sensor does not necessarily need to be provided on the electronic pen side.

The electronic pen shown in this embodiment mode can accurately read information written down on a display portion as electronic information without using an image sensor and store the electronic information. Further, since the electronic pen described in this embodiment mode receives electric power wirelessly from the outside and stores the electric power in a battery for carrying out a circuit operation, change of the battery is not needed. In addition, since charging is conducted wirelessly, the pen can be charged while being used, and a large-sized rechargeable battery is not needed. Accordingly, a small and light-weight writing instrument can be provided.

Embodiment Mode 3

Next, Embodiment Mode 3, which is different from the embodiment mode of FIG. 1, will be described with reference to FIGS. 5 to 7. An electronic pen 101 shown in FIG. 5 has a structure in which a remaining amount detection circuit 402 and a modulation circuit 401 are added to the structure of the embodiment mode shown in FIG. 1.

An electric charge stored in a battery 107 shown in FIG. 1 decreases gradually as the electronic pen continues operation. Then, the voltage of the battery 107 also decreases gradually. At the time when the voltage of the battery 107 becomes lower than minimum operating voltages of a first sensor 103, a second sensor 104, a control circuit 105, and a memory 106, the electronic pen 101 cannot operate and data cannot be stored in the memory. To overcome this problem, a structure of charging the electronic pen 101 in response to detection of battery shortage in the electronic pen 101 will be described.

Figure 5:
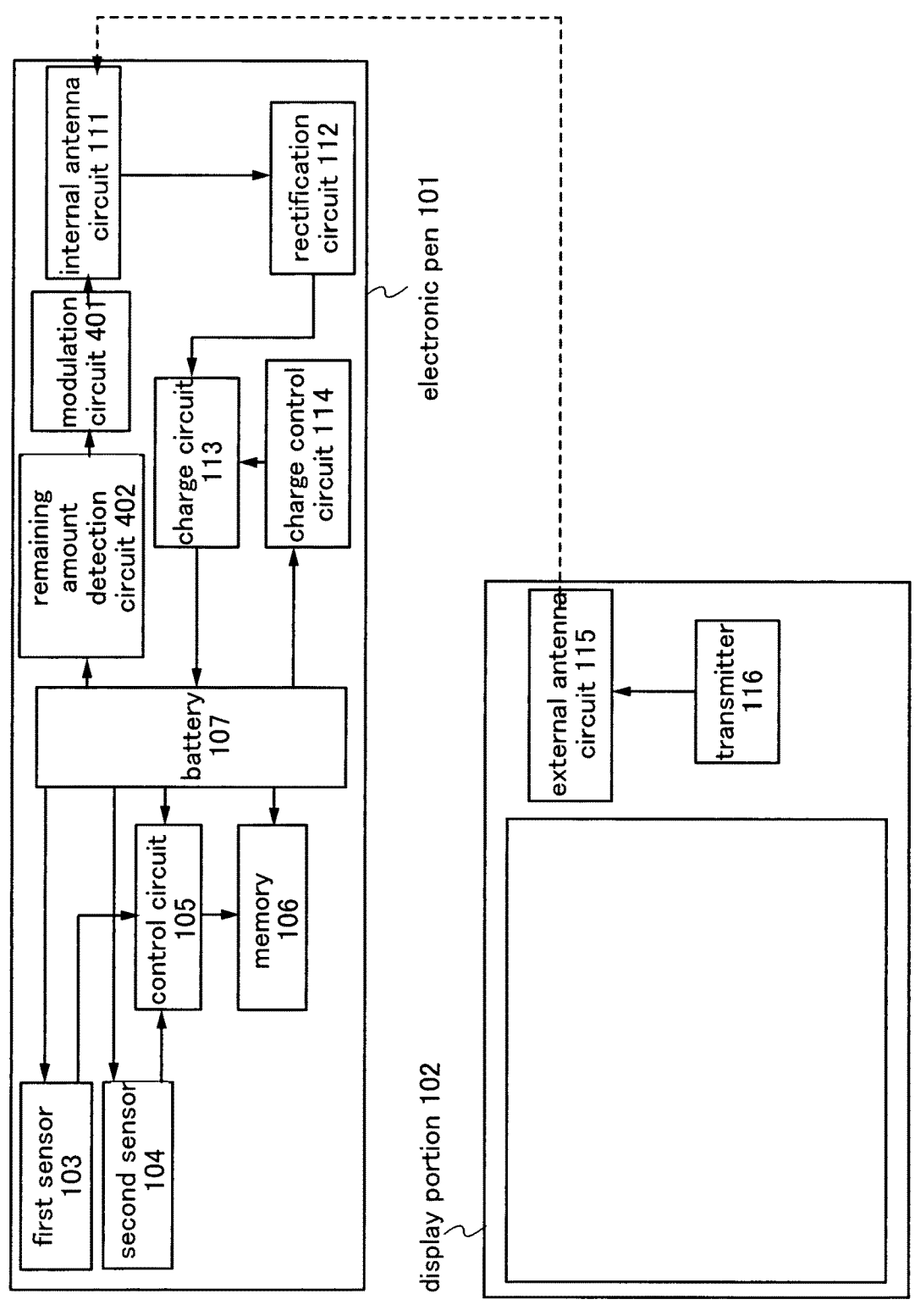
FIG. 5 is a conceptual diagram for explaining the present invention.
Figure 6:
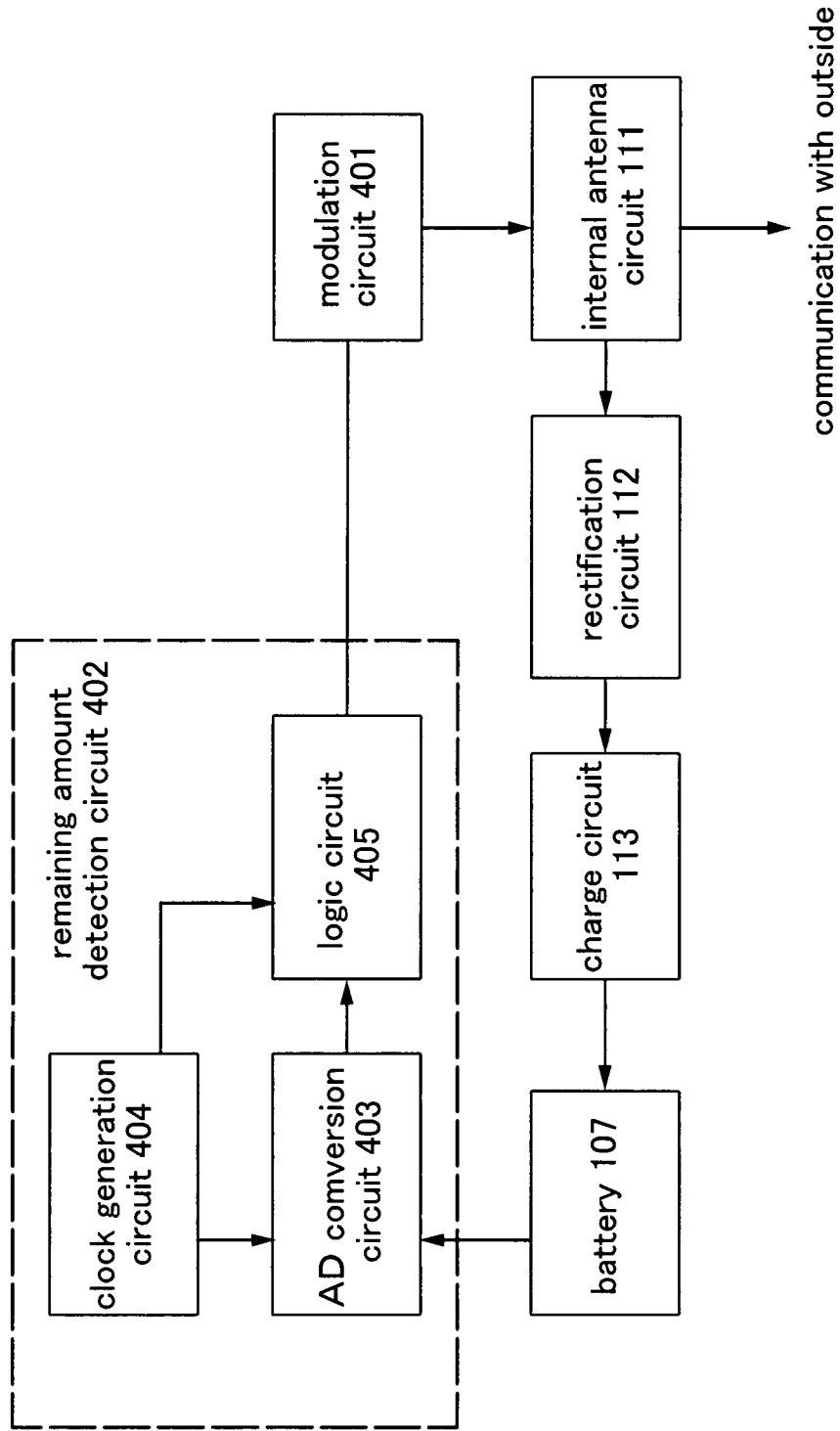
FIG. 6 is a conceptual diagram for explaining the present invention.

FIG. 6 is a block diagram of the remaining amount detection circuit 402 shown in FIG. 5. The remaining amount detection circuit 402 shown in this embodiment mode includes an A/D conversion circuit 403, a clock generation circuit 404, and a logic circuit 405. Note that the remaining amount detection circuit of the present invention is not limited to that shown in FIG. 6 and another remaining amount detection circuit may also be used. The A/D conversion circuit 403 converts an output voltage of the battery 107 into a digital output voltage.

In FIG. 6, the digitized voltage data is input into the logic circuit 405. The logic circuit 405 encodes the digital voltage data. As an encode system, a deformation mirror code, a NRZ-L code, or the like can be used; however, the encode system is not limited thereto. The clock generation circuit 404 supplies clocks to the A/D conversion circuit 403 and the logic circuit 405. The output of the logic circuit 405 is transmitted to the modulation circuit 401, where a wireless signal externally input is modulated.

In such a manner, the voltage of the battery 107 can externally be monitored through the A/D conversion circuit 403, the logic circuit 405, the modulation circuit 401, and an internal antenna circuit 111. When an electric charge stored in the battery 107 decreases and the voltage of the battery 107 decreases, the modulated signal is monitored so that necessity of charging can be checked.

Figure 7:
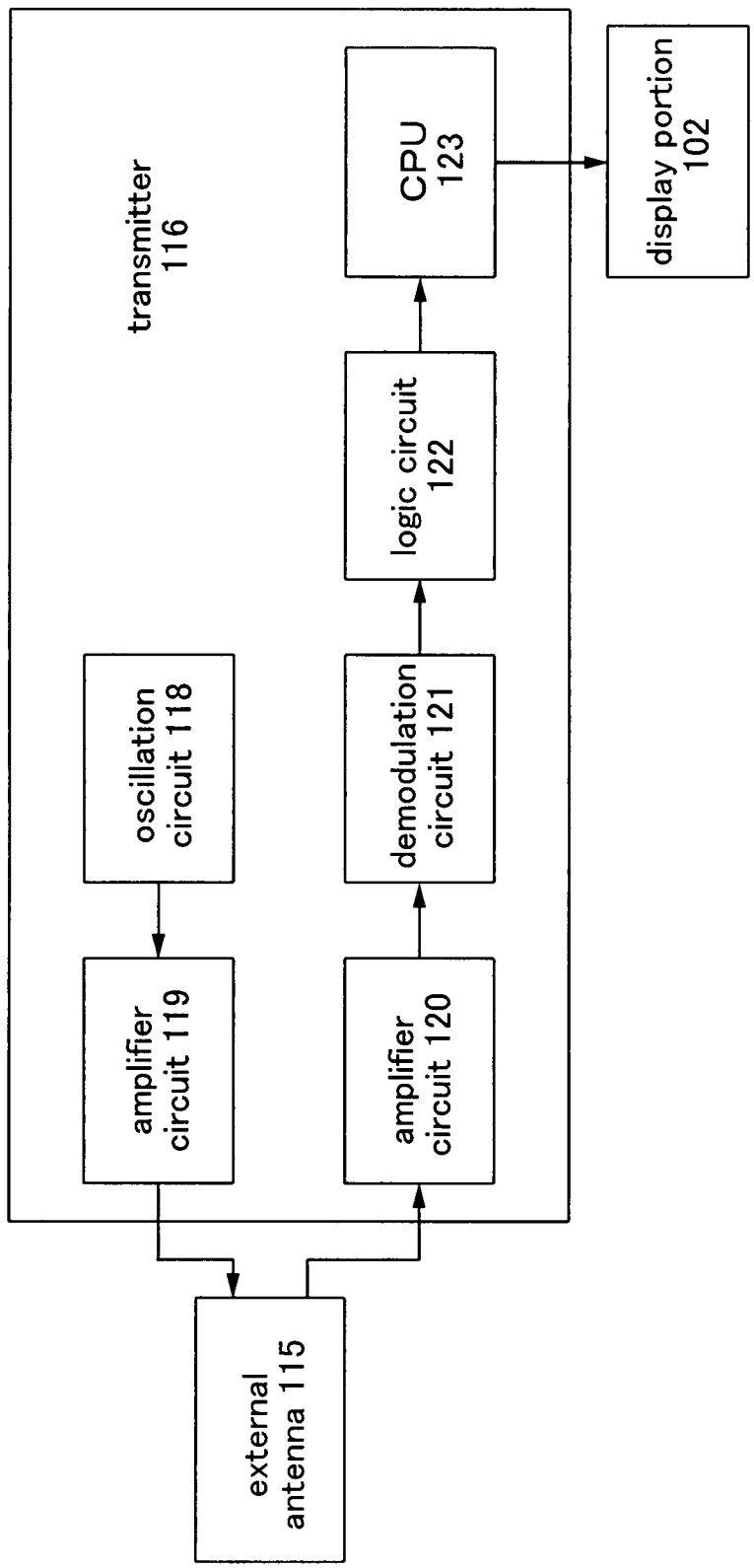
FIG. 7 is a conceptual diagram for explaining the present invention.

FIG. 7 is an example of a transmitter 116 corresponding to the electronic pen having the above-described monitor function. The transmitter 116 includes an oscillation circuit 118, amplifier circuits 119 and 120, a demodulation circuit 121, a logic circuit 122, and a CPU 123. An output signal of the oscillation circuit 118 is amplified in the amplifier circuit 119 and is transmitted to the electronic pen from an external antenna circuit 115. At this time, if the electronic pen is in a monitor state, a signal of the external antenna circuit 115 is modulated with the voltage data of the battery. The amplifier circuit 120 amplifies the signal and demodulates the voltage data in the demodulation circuit 121. Then, the decode operation is performed in the logic circuit 122 so that source digital voltage data of the battery can be obtained. This data is input into the CPU 123 to determine whether there is necessity of charging, and if there is the necessity, charging is automatically performed. In addition, the result is displayed on a display portion 102 so that notification of the situation can be viewed by the user with their eyes. If there is the necessity of charging, the charging is continued without change. If there is no necessity, the transmission from the transmitter may be stopped at the stage when the display confirmation is completed.

In the above-described manner, the electronic pen of this embodiment mode can monitor charged amount of the battery from the outside and charging can be automatically conducted at the time of battery shortage. Therefore, battery exhaustion is not a concern while using the electronic pen. Further, users can check the charged amount with their eyes.

The electronic pen shown in this embodiment mode can accurately read information written down on a display portion as electronic information without using an image sensor and store the electronic information. Further, since the electronic pen described in this embodiment mode receives electric power wirelessly from the outside and stores the electric power in a battery for carrying out a circuit operation, change of the battery is not needed. In addition, since charging is conducted wirelessly, the pen can be charged while being used, and a large-sized rechargeable battery is not needed. Accordingly, a small and light-weight writing instrument can be provided.

Embodiment Mode 4

Embodiment Mode 4 will describe a structure of an electronic pen that is different from those of the above-described embodiment modes.

Figure 8:
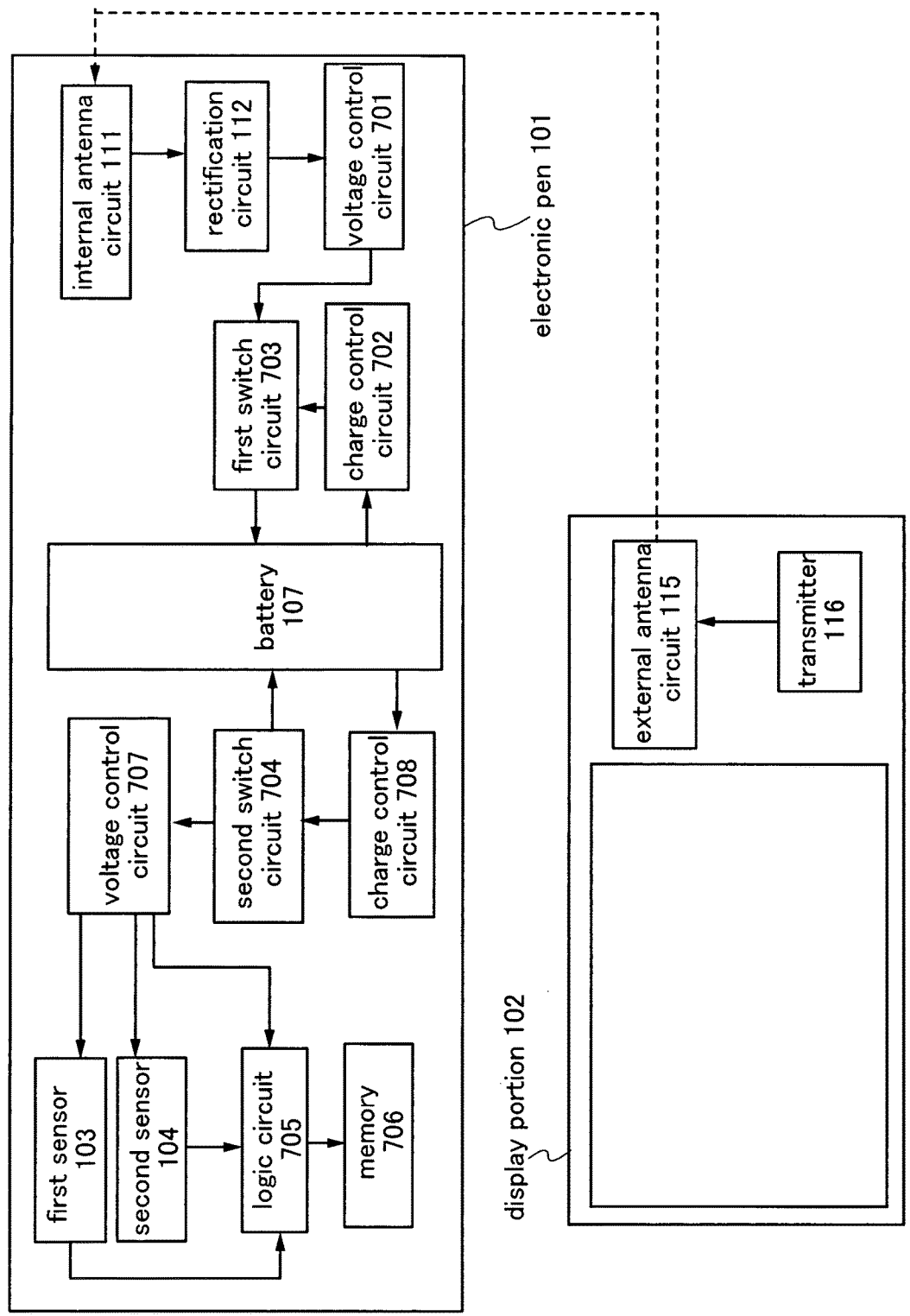
FIG. 8 is a conceptual diagram for explaining the present invention.

The electronic pen shown in FIG. 8 includes an internal antenna circuit 111, a rectification circuit 112, a voltage control circuit (also referred to as a regulator) 701, a battery 107, a charge control circuit 702, a first switch circuit 703, a second switch circuit 704, a logic circuit 705, a memory 706, a voltage control circuit 707, a charge control circuit 708, a first sensor 103, and a second sensor 104.

In FIG. 8, an output terminal of the internal antenna circuit 111 is connected to an input terminal of the rectification circuit 112, and an output terminal of the rectification circuit 112 is connected to an input terminal of the voltage control circuit 701. In addition, an output terminal of the voltage control circuit 701 is connected to an input terminal of the battery 107 through the first switch circuit 703. Further, the charge control circuit 702 connected to the battery 107 monitors a charge state of the battery, and correspondingly to the charge state, the charge control circuit 702 controls ON or OFF of the first switch circuit 703.

The battery 107 is connected to the logic circuit 705 through the second switch circuit 704. Here, the charge state of the battery 107 is monitored by the charge control circuit 708, and correspondingly to the charge state, the charge control circuit 708 controls ON or OFF of the second switch circuit 704. For example, the charge control circuit 708 turns the second switch circuit 704 ON when the voltage of the battery is a certain value V1 or higher, and when the voltage of the battery is a certain value V2 (V1>V2) or lower after consumption of power of the battery, the charge control circuit 708 turns the second switch circuit 704 OFF. The value V1 is a voltage enough for driving a processing circuit or the like connected to the battery, and the value V2 is a minimum driving voltage.

Figure 9A:
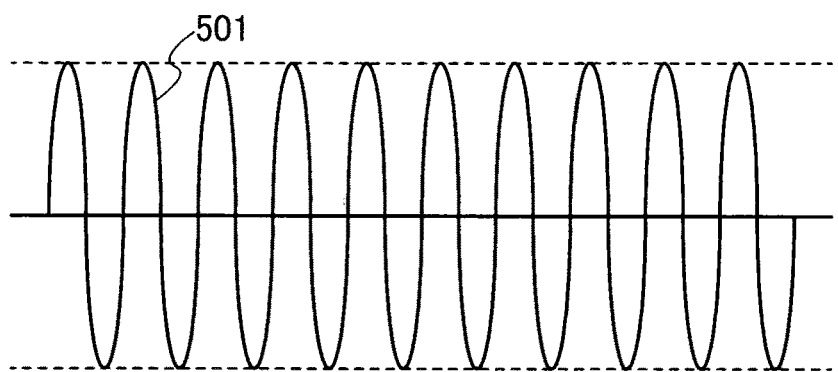
FIGS. 9A to 9C are conceptual diagrams for explaining the present invention.
Figure 10:
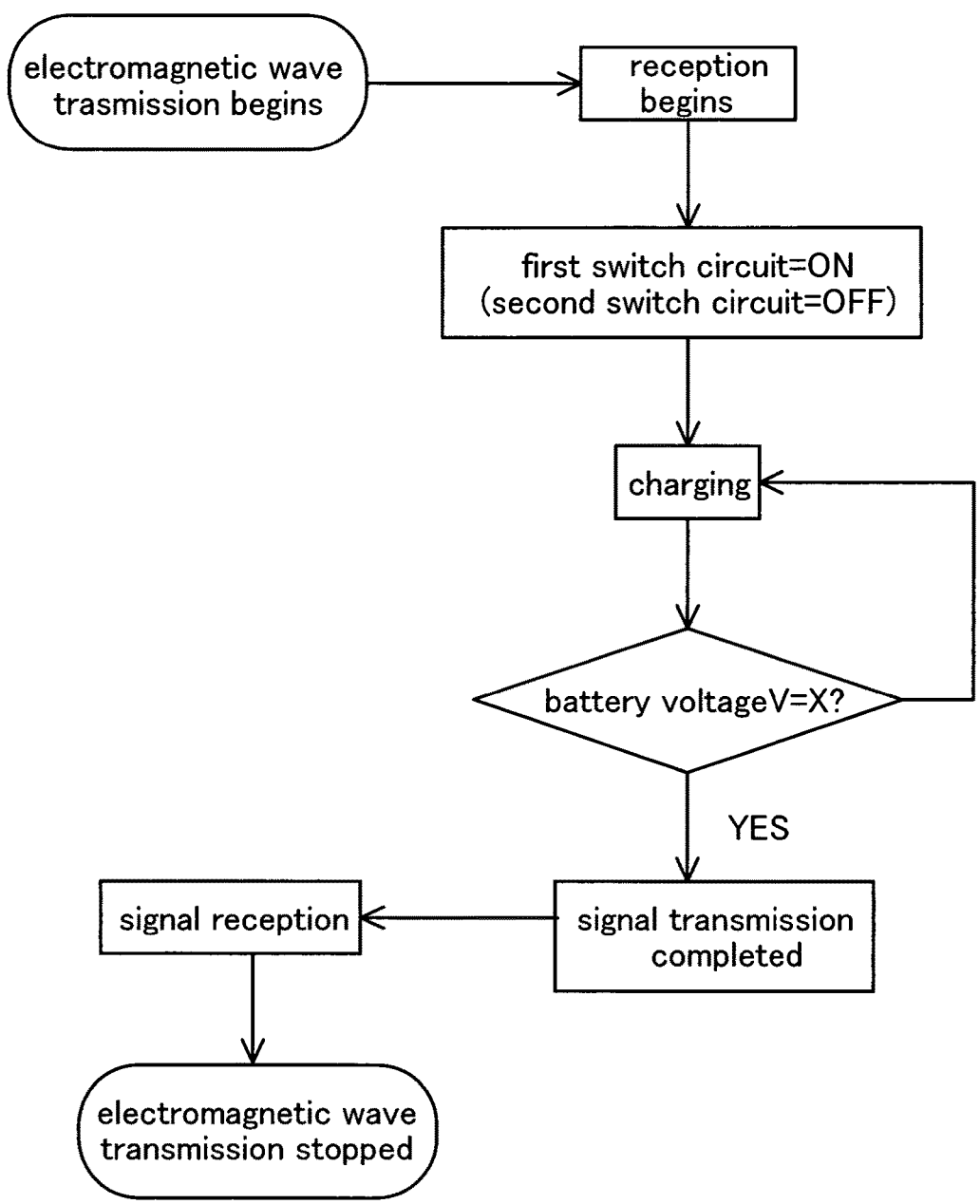
FIG. 10 is a conceptual diagram for explaining the present invention.

In the case where the battery 117 is charged with an electric wave emitted from the external antenna circuit 115, an electromagnetic wave 501 which has equal amplitude as shown in FIG. 9A can be used for communication. A charging method at this time is shown in the flow chart of FIG. 10.

First, an electromagnetic wave having equal amplitude is transmitted from the external antenna circuit provided in the display portion. Upon reception of the electromagnetic wave by the internal antenna circuit provided in the electronic pen, the first switch circuit is turned ON and charging of the battery is started. At this time, the charge state of the battery is monitored by the charge control circuit. For example, the voltage V of the battery is monitored and when the voltage V of the battery becomes a predetermined voltage X or higher, a signal that informs the completion of the charging is sent. Upon reception of the signal, the external antenna circuit stops transmission of the electromagnetic wave.

Figure 9B:
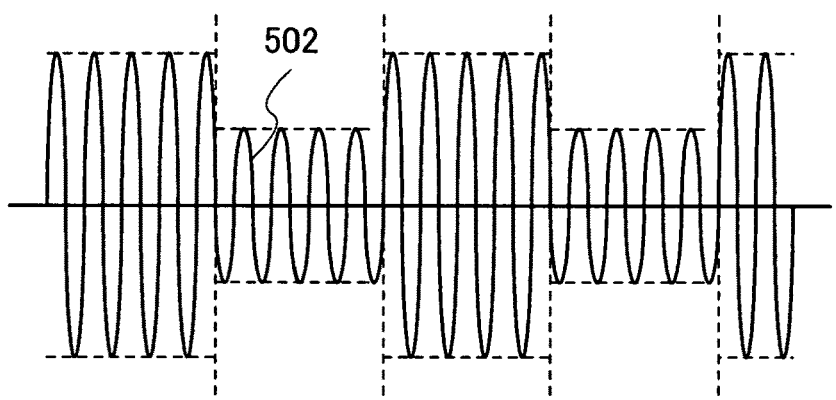
Figure 9C:
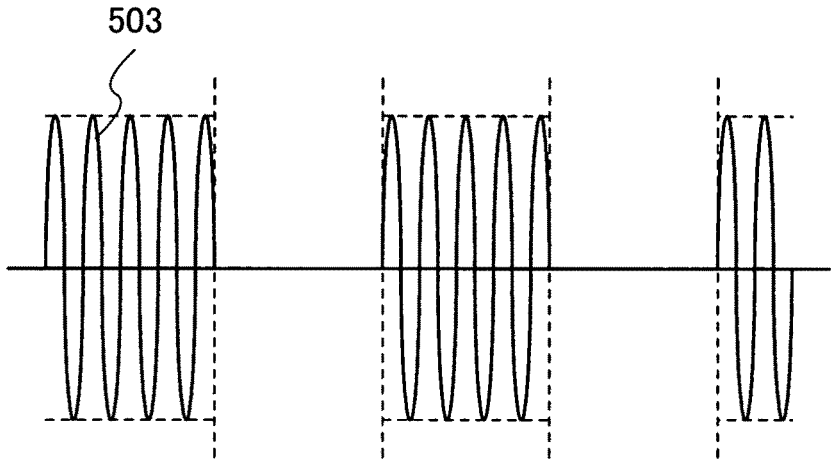
Figure 11:
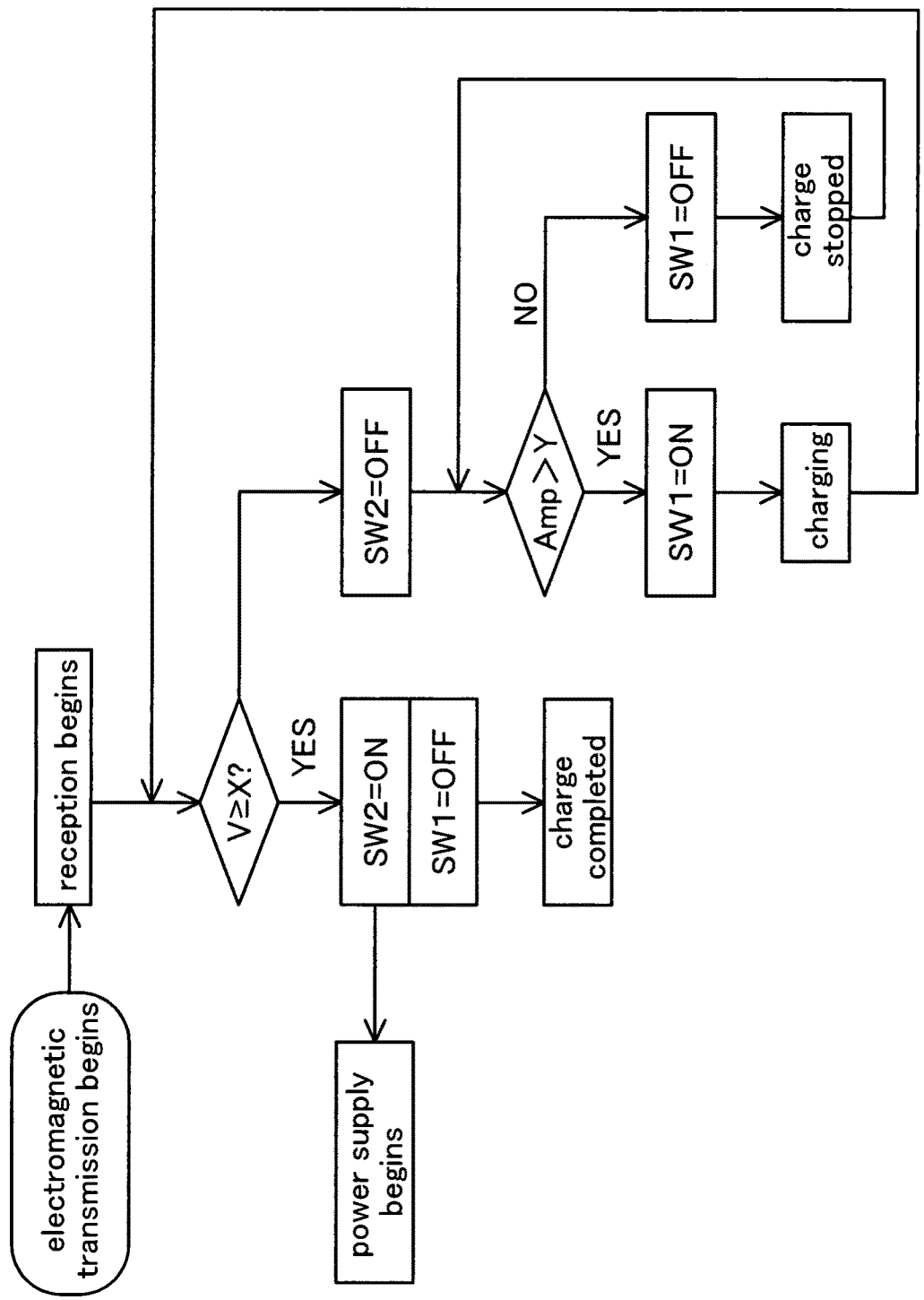
FIG. 11 is a conceptual diagram for explaining the present invention.

The cases of communication between the internal antenna and the external antenna using electromagnetic waves 502 and 503 which have different amplitudes as shown in FIG. 9B and FIG. 9C will be described. Here, FIG. 9B shows the case where the electromagnetic wave has a large amplitude and a small amplitude. FIG. 9C shows the case where the electromagnetic wave has a large amplitude and zero amplitude, that is the case where the electromagnetic wave is turned ON and OFF. An example of a charging method in such cases is shown in the flow chart of FIG. 11. Note that in the drawing, SW1 denotes the first switch circuit, and SW2 denotes the second switch circuit.

First, the electromagnetic wave is transmitted from the external antenna provided in the display portion. When the internal antenna receives the electromagnetic wave, whether the voltage V of the battery is the voltage X or more or not is checked. Then, when the voltage V of the battery is lower than the predetermined voltage X, the second switch circuit is turned OFF in order not to supply electric power of the battery to other circuits. Next, whether an amplitude Amp of the electromagnetic wave output from the external antenna is a predetermined amplitude Y or more or not is checked. If the amplitude Amp is the predetermined amplitude Y or less, the first switch circuit is turned OFF so that charging is stopped. Then, the amplitude Amp of the electromagnetic wave from the external antenna to become the predetermined amplitude Y or more is waited for.

Here, if the amplitude of the electromagnetic wave from the external antenna is the predetermined amplitude or more, the first switch circuit is turned ON and charging is started. To monitor the charge state of the battery while charging, whether the voltage of the battery is the predetermined voltage or more or not is checked. When the voltage of the battery becomes the predetermined voltage or more, the first switch circuit is turned OFF and charging is stopped. Then, the second switch circuit is turned ON and supply of electric power to the logic circuit is started.

In this embodiment mode, when the amplitude of the electromagnetic wave output from the external antenna is smaller than the predetermined amplitude, the first switch circuit is turned OFF, so that backflow of electric power in the internal antenna direction from the battery can be prevented. When the battery is once charged, it has a sufficient amount of electric power for driving a circuit which performs signal processing in a wireless communication. Accordingly, the first switch circuit may be turned OFF when electric power starts being supplied to the logic portion, and charging may be stopped. Alternatively, a structure in which charging is continued during communication without turning OFF the first switch circuit, may be employed.

The electronic pen shown in this embodiment mode can accurately read information written down on a display portion as electronic information without using an image sensor and store the electronic information. Further, since the electronic pen described in this embodiment mode receives electric power wirelessly from the outside and stores the electric power in a battery for carrying out a circuit operation, change of the battery is not needed. In addition, since charging is conducted wirelessly, the pen can be charged while being used, and a large-sized rechargeable battery is not needed. Accordingly, a small and light-weight writing instrument can be provided.

Embodiment Mode 5

Embodiment Mode 5 will describe a structural example of a thin-film battery as the battery shown in FIG. 1. In this embodiment mode, a structural example of a battery in the case of using a lithium ion battery is shown in FIG. 12.

Figure 12:
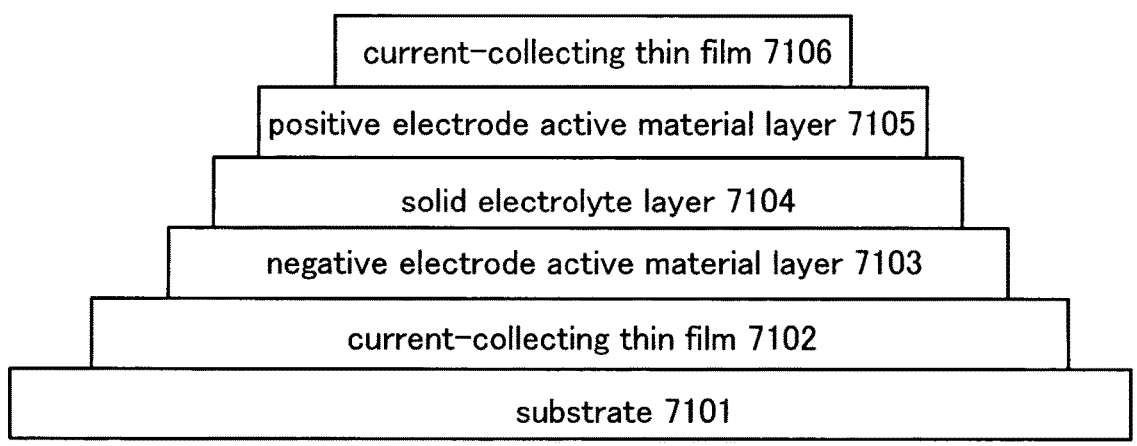
FIG. 12 is a conceptual diagram for explaining the present invention.

FIG. 12 is a cross-sectional schematic view of a thin-film battery. A current-collecting thin film 7102 to serve as an electrode is formed over a substrate 7101. The current-collecting thin film 7102 is required to have high adhesion to a negative electrode active material layer 7103 and also have low resistance. For example, aluminum, copper, nickel, vanadium, or the like can be used. Next, the negative electrode active material layer 7103 is formed over the current-collecting thin film 7102. Generally, vanadium oxide ($V_2O_5$) or the like is used. Next, a solid electrolyte layer 7104 is formed over the negative electrode active material layer 7103. Generally, lithium phosphate ($Li_3PO_4$) or the like is used. Then, a positive electrode active material layer 7105 is formed over the solid electrolyte layer 7104. Generally, lithium manganate ($LiMn_2O_4$) or the like is used. Lithium cobaltate ($LiCoO_2$) or lithium nickel oxide ($LiNiO_2$) can also be used. Next, a current-collecting thin film 7106 to serve as an electrode is formed over the positive electrode active material layer 7105. The current-collecting thin film 7106 is required to have high adhesion to the positive electrode active material layer 7105 and also have low resistance. For example, aluminum, copper, nickel, vanadium, or the like can be used. Note that compared to a nickel-cadmium battery, a lead-acid battery, or the like, the lithium ion battery causes less memory effect and have a larger amount of current.

Each of the above thin layers of the current-collecting thin film 7102, the negative electrode active material layer 7103, the solid electrolyte layer 7104, the positive electrode active material layer 7105, and the current-collecting thin film 7106 may be formed by using a sputtering technique or a vapor-deposition technique. In addition, each thickness of the current-collecting thin film 7102, the negative electrode active material layer 7103, the solid electrolyte layer 7104, the positive electrode active material layer 7105, and the current-collecting thin film 7106 is preferably 0.1 to 3 μm.

Next, the operation in charging and discharging the battery will be described. In charging the battery, lithium ions are desorbed from the positive electrode active material layer 7105. Then, the lithium ions are absorbed into the negative electrode active material layer 7103 through the solid electrolyte layer 7104. At this time, electrons are released to the outside from the positive electrode active material layer 7105.

In discharging the battery, on the other hand, lithium ions are desorbed from the negative electrode active material layer 7103. Then, the lithium ions are absorbed into the positive electrode active material layer 7105 through the solid electrolyte layer 7104. At this time, electrons are released to the outside from the negative electrode active material layer 7103. The thin-film secondary battery operates in this manner.

Note that it is preferable to stack another set of thin layers of the current-collecting thin film 7102, the negative electrode active material layer 7103, the solid electrolyte layer 7104, the positive electrode active material layer 7105, and the current-collecting thin film 7106, because larger electric power can be charged in or discharged from the battery with such a structure.

The battery in this embodiment mode is a thin film with a thickness of about 10 μm or less and capable of charging and discharging. Therefore, when the battery of this embodiment mode is used, a small and light-weight electronic pen can be manufactured.

Embodiment Mode 6

Figure 13:
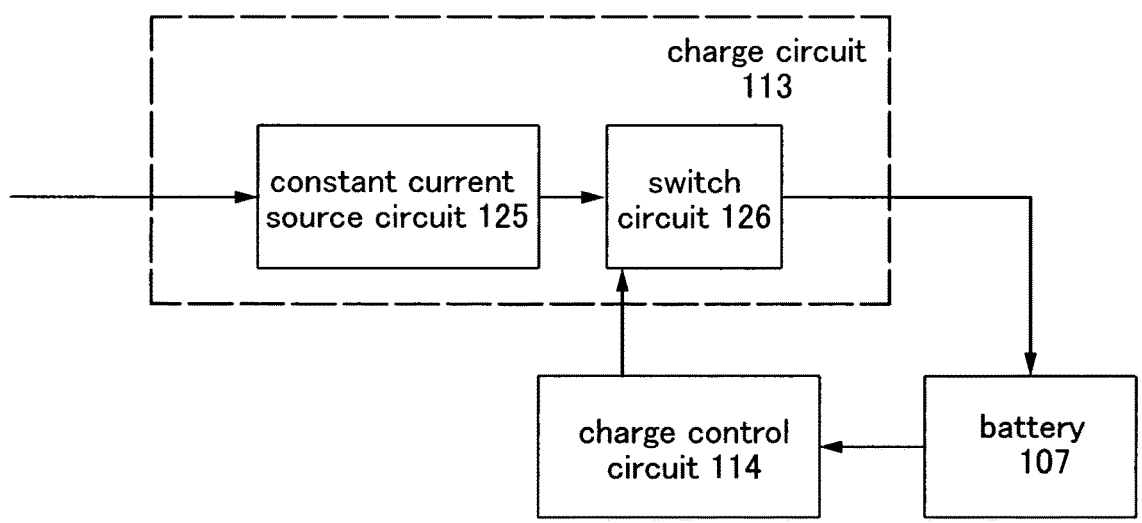
FIG. 13 is a conceptual diagram for explaining the present invention.

When using a chargeable battery, it is generally necessary to control charging and discharging of the battery. It is necessary to conduct charging while monitoring the charge state of a battery in order to prevent overcharging. A circuit for charge control will be described in this embodiment mode. FIG. 13 is a block diagram of the charge circuit 113, the charge control circuit 114, and the battery 107 shown in FIG. 1.

In the example shown in FIG. 13, the charge circuit 113 includes a constant current source circuit 125 and a switch circuit 126, and is connected to the charge control circuit 114 and the battery 107. The charge circuit shown in FIG. 13 is only an example, and the invention is not limited to this structure. A different structure may be employed. Although the battery is charged with a constant current in this embodiment mode, a power source may be switched from a constant current at a certain point so that the battery can be charged with a constant voltage. In addition, another method without using a constant current may also be employed. Further, transistors included in the circuits which will be described below may be any of thin film transistors, transistors on a single-crystalline substrate, or organic transistors.

Figure 14:
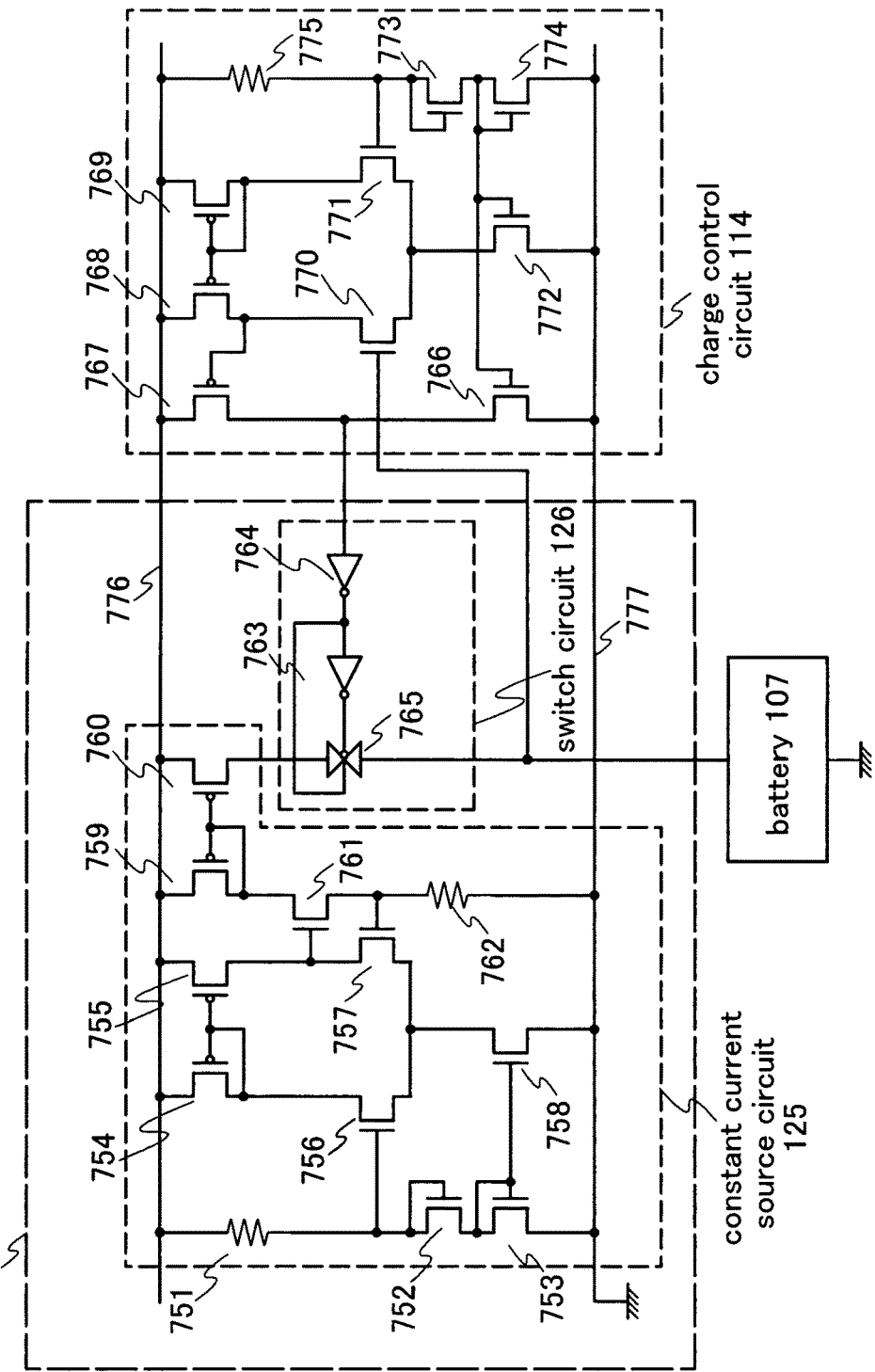
FIG. 14 is a conceptual diagram for explaining the present invention.

FIG. 14 is a detailed diagram of the circuit shown in FIG. 13. The operation of the circuit will be described below. The constant current source circuit 125, the switch circuit 126, and the charge control circuit 114 use a high potential power supply line 776 and a low potential power supply line 777 as power supply lines. In FIG. 13, the low potential power supply line 777 is used as a GND line. However, the potential of the low potential power supply line 777 is not limited to the GND, and may have a different potential.

The constant current source circuit 125 includes transistors 752 to 761 and resistors 751 and 762. A current flows into the transistors 752 and 753 from the high potential power supply line 776 through the resistor 751, so that the transistors 752 and 753 are turned ON.

The transistors 754, 755, 756, 757, and 758 constitute a feedback differential amplifier, and the gate potential of the transistor 757 is almost the same as the gate potential of the transistor 752. The drain current of the transistor 761 has a value obtained by dividing a potential difference between the gate potential of the transistor 757 and the potential of the low potential power supply line 777 by the resistance value of the resistor 762. The drain current is input into the current mirror circuit which is constructed from the transistors 759 and 760, and an output current of the current mirror circuit is supplied to the switch circuit 126. The constant current source circuit 125 is not limited to this structure and a different structure may be used.

The switch circuit 126 includes a transmission gate 765 and inverters 763 and 764. The input signal of the inverter 764 controls whether to supply a current to the battery 107 from the constant current source circuit 125. The switch circuit is not limited to this structure and a different structure may be used.

The charge control circuit 114 includes transistors 766 to 774 and a resistor 775. A current flows into the transistors 773 and 774 from the high potential power supply line 776 through the resistor 775, so that the transistors 773 and 774 are turned ON. The transistors 768, 769, 770, 771, and 772 constitute a differential comparator. When the gate potential of the transistor 770 is lower than the gate potential of the transistor 771, the drain potential of the transistor 768 has almost the same value as the potential of the high potential power supply line 776, whereas when the gate potential of the transistor 770 is higher than the gate potential of the transistor 771, the drain potential of the transistor 768 has almost the same value as the source potential of the transistor 770.

When the drain potential of the transistor 768 has almost the same value as the potential of the high potential power supply line 776, the charge control circuit 114 outputs a low-level potential through a buffer which is constituted from the transistors 767 and 766. When the drain potential of the transistor 768 has almost the same value as the source potential of the transistor 770, the charge control circuit 114 outputs a high-level potential through the buffer which is constituted from the transistors 767 and 766.

When the output of the charge control circuit 114 is low, a current is supplied to the battery 107 through the switch circuit 126. Meanwhile, when the output of the charge control circuit 114 is high, the switch circuit 126 is turned OFF and no current is supplied to the battery 107. A gate of the transistor 770 is connected to the battery 107; therefore, when the battery 107 is charged and the potential of the battery surpasses the threshold voltage of the comparator of the charge control circuit 114, charging is stopped. Although the threshold voltage of the comparator in this embodiment mode is set at the gate potential of the transistor 773, the potential is not limited to this value, and a different potential may be set. The set potential is generally determined in accordance with the intended use of the device and the performance of the battery. The structure of the charge circuit for the battery is not limited to this structure.

The electronic pen shown in this embodiment mode can accurately read information written down on a display portion as electronic information without using an image sensor and store the electronic information. Further, since the electronic pen described in this embodiment mode receives electric power wirelessly from the outside and stores the electric power in a battery for carrying out a circuit operation, change of the battery is not needed. In addition, since charging is conducted wirelessly, the pen can be charged while being used, and a large-sized rechargeable battery is not needed. Accordingly, a small and light-weight writing instrument can be provided. Furthermore, since charge control is performed in charging, overcharging of the battery can be prevented.

Embodiment Mode 7

Figure 18:
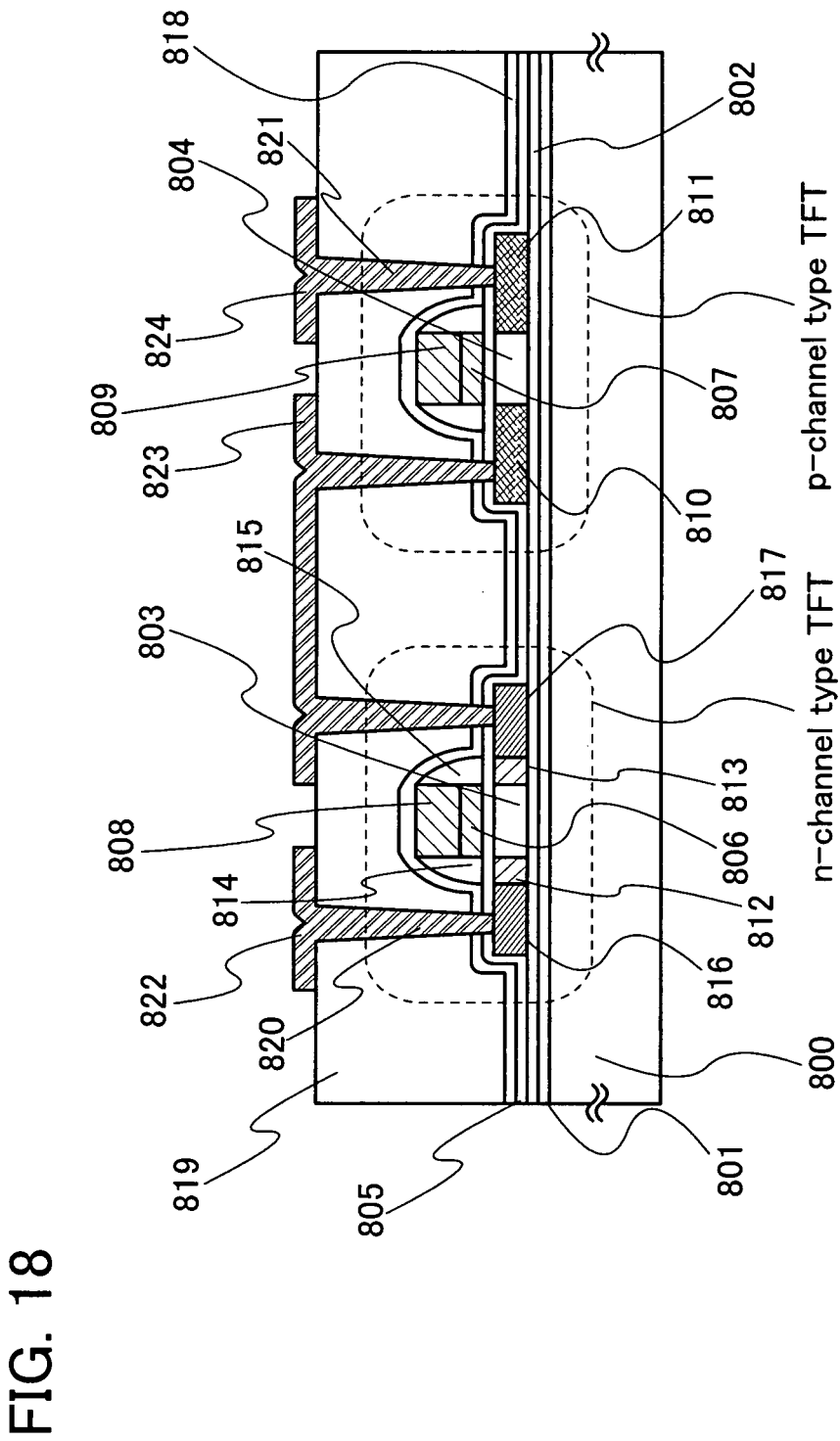
FIG. 18 is a conceptual diagram for explaining the present invention.

Embodiment Mode 7 will describe a method for manufacturing the thin film transistor, which is used in the above-described embodiment mode, with reference to FIG. 18. Note that, in this embodiment mode, an n-channel thin film transistor (hereinafter, referred to as a TFT) and a p-channel type TFT are taken as examples of semiconductor elements; however, the semiconductor elements are not limited thereto in the present invention. In addition, this manufacturing method is just an example and does not limit a manufacturing method of a semiconductor element.

First, over an insulating substrate 800, base films 801 and 802 formed of an insulating film such as a silicon oxide film, a silicon nitride film, a silicon oxynitride film, or the like are formed. For example, a silicon oxynitride film is formed with a thickness of 10 to 200 nm as the base film 801, and then a hydrogenated silicon oxynitride film is formed to be stacked with a thickness of 50 to 200 nm as the base film 802.

Island-like semiconductor layers 803 and 804 are formed of a crystalline semiconductor film which is formed using a semiconductor film having an amorphous structure by a known laser crystallization method or thermal crystallization method. These island-like semiconductor layers 803 and 804 are each formed with a thickness of 25 to 80 nm. The material of the crystalline semiconductor film is not limited; however, silicon, a silicon-germanium (SiGe) alloy, or the like is preferably used.

Next, a gate insulating film 805 is formed so as to cover the island-like semiconductor layers 803 and 804. The gate insulating film 805 is formed of insulating film containing silicon by a plasma CVD method or a sputtering method so as to have a thickness of greater than or equal to 10 nm and less than or equal to 80 nm.

Then, first conductive layers 806 and 807 are formed over the gate insulating film 805. Next, second conductive layers 808 and 809 are formed, and the stack of the first conductive layer 806 and the second conductive layer 808 and the stack of the first conductive layer 807 and the second conductive layer 809 are etched at the same time, whereby gate electrodes of TFTs are formed.

In this embodiment mode, the first conductive layers 806 and 807 are formed of tantalum nitride with a thickness of 50 to 100 nm, while the second conductive layers 808 and 809 are formed of tungsten with a thickness of 100 to 300 nm. However, the material of the conductive layers is not particularly limited, and an element of Ta, W, Ti, Mo, Al, Cu, or the like, or an alloy or a compound containing the element as its main component may be used for forming the conductive layers.

Next, a p-channel type TFT is doped with an element imparting p-type conductivity to form first impurity regions 810 and 811. Then, in order to form LDD regions of an n-channel type TFT, doping with an element imparting n-type conductivity is conducted, and second impurity regions 812 and 813 are formed. Thereafter, sidewalls 814 and 815 are formed and the n-channel type TFT is doped with an element imparting n-type conductivity, so that third impurity regions 816 and 817 are formed. Such doping methods may be performed by an ion doping method or an ion implantation method. Through these steps, the impurity regions are formed in each of the island-like semiconductor layers.

Then, the impurity elements added to the island-like semiconductor layers are activated. This step is performed by a thermal annealing method using an annealing furnace. Alternatively, a laser annealing method or a rapid thermal annealing (RTA) method may be employed. Further, the island-like semiconductor layers are hydrogenated by application of heat treatment at a temperature of 300 to 450° C. for 1 to 12 hours in an atmosphere containing 3 to 100% of hydrogen. Plasma hydrogenation (using hydrogen excited by plasma) may also be performed as another means of hydrogenation.

A first interlayer insulating film 818 is formed of a silicon oxynitride film. The thickness of the first interlayer insulating film 818 is made to be 10 to 80 nm similarly to the thickness of the gate insulating film. Then, a second interlayer insulating film 819 is formed of an organic insulating material such as acrylic. Instead of the organic insulating material, an inorganic material may also be used for the second interlayer insulating film 819. As the inorganic material, inorganic $SiO_2$, $SiO_2$ obtained by a plasma CVD method (PCVD-$SiO_2$), a silicon oxide film applied by an SOG (Spin on Glass) method, or the like is used.

Next, contact holes 820 and 821 are formed. In addition, electrodes 822 to 824 which are in contact with source and drain regions of the island-like semiconductor layers are formed.

As described above, the n-channel type TFT with an LDD structure and the p-channel type TFT with a single drain structure can be formed over the substrate.

Next, a manufacturing method up to the step of forming a circuit portion and transferring the circuit portion to a flexible substrate will be described with reference to FIGS. 19A and 19B and FIGS. 20A and 20B. Note that, in this embodiment mode, an n-channel type TFT and a p-channel type TFT are used as examples of semiconductor elements; however, the semiconductor elements of the present invention are not limited thereto. In addition, this manufacturing method is just an example and does not limit a manufacturing method of a semiconductor element over an insulating substrate.

First, a peeling layer 900 is formed over the insulating substrate 800. The peeling layer 900 can be formed by a sputtering method, a plasma CVD method, or the like using a layer containing silicon as its main component, such as amorphous silicon, polycrystalline silicon, single crystalline silicon, or microcrystalline silicon (including semi-amorphous silicon). In this embodiment mode, amorphous silicon having a thickness of approximately 500 nm is formed by a sputtering method to be used as the peeling layer 900. Next, a circuit portion as shown in FIG. 18 is formed in accordance with an operation process described above.

Next, a third interlayer insulating film 901 is formed over the second interlayer insulating film 819, and then pads 902 and 903 are formed. The pads 902 and 903 can be formed using a conductive material including one or more of metals such as Ag, Au, Cu, Pd, Cr, Mo, Ti, Ta, W, and Al, or metal compounds thereof.

A protective layer 904 is formed over the third interlayer insulating film 901 so as to cover the pads 902 and 903. The protective layer 904 is formed of a material that can protect the pads 902 and 903 when the peeling layer 900 will subsequently be etched away. For example, the protective layer 904 can be formed by application of, over the entire surface, an epoxy-based resin, an acrylate-based resin, or a silicon-based resin that is soluble in water or alcohols (FIG. 19A).

Then, a groove 905 for isolating the peeling layer 900 is formed to such an extent that the peeling layer 900 is exposed (see FIG. 19B). The groove 905 can be formed by a method of etching, dicing, scribing, or the like.

Figure 20A:
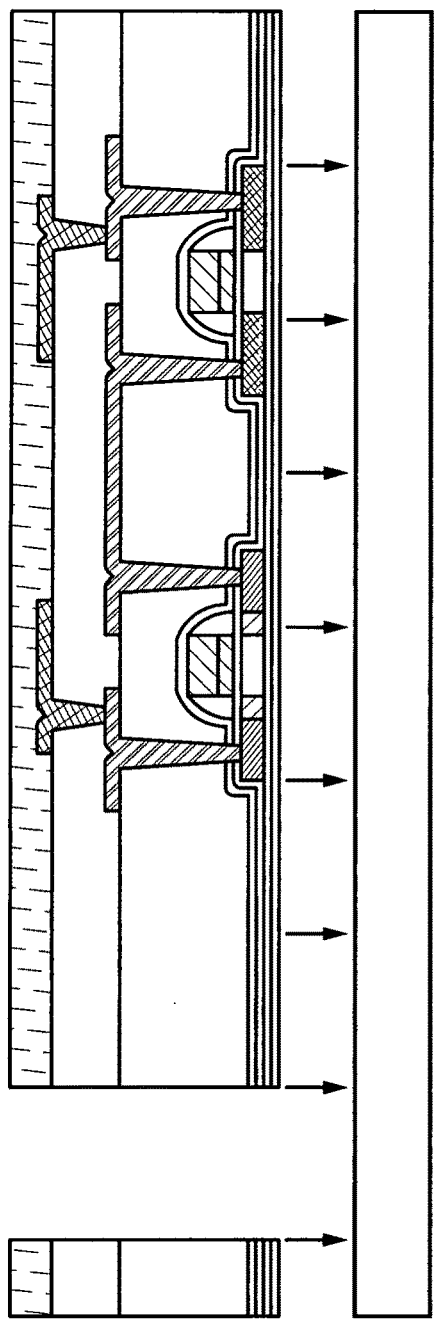
FIGS. 20A and 20B are conceptual diagrams for explaining the present invention.

Next, the peeling layer 900 is etched away (see FIG. 20A). In this embodiment mode, halogen fluoride is used as an etching gas and introduced through the groove 905. In this embodiment mode, etching is performed for three hours using, for example, $ClF_3$ (chlorine trifluoride) at a temperature of 350° C., a flow rate of 300 sccm, and a pressure of 798 Pa. Alternatively, a $ClF_3$ gas mixed with nitrogen may also be used. By using halogen fluoride such as $ClF_3$, the peeling layer 900 can be selectively etched and thus, the insulating substrate 800 can be peeled off. Note that halogen fluoride may be either a gas or a liquid.

Figure 20B:
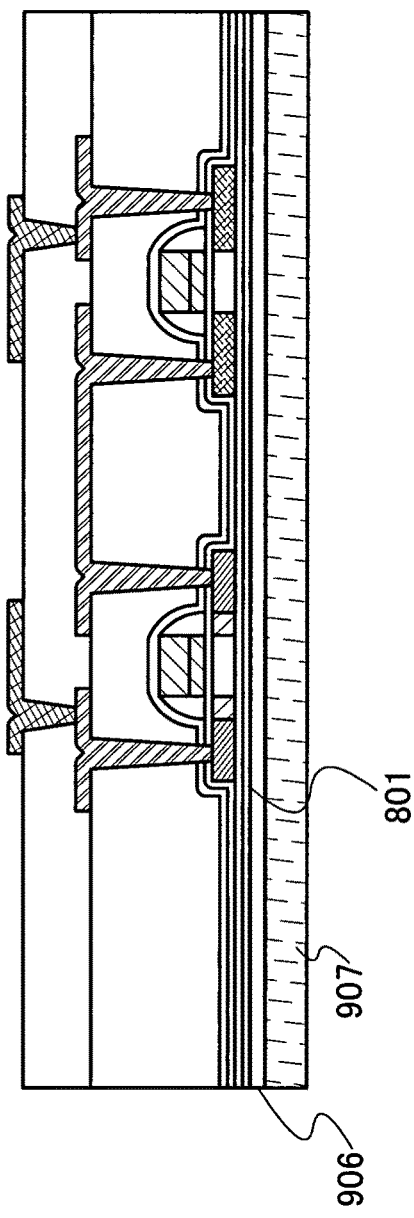

Next, the peeled circuit portion is attached to a support base 907 with an adhesive 906 (FIG. 20B). The adhesive 906 is formed of a material capable of attaching the support base 907 to the base film 801. As the adhesive 906, for example, various curable adhesives can be used such as a reactive curable adhesive, a thermosetting adhesive, a photo-curable adhesive such as an ultraviolet curable adhesive, and an anaerobic adhesive.

For the support base 907, an organic material such as flexible paper or flexible plastic can be used. Alternatively, the support base 907 may be formed of a flexible inorganic material. It is desirable that the support base 907 have a high thermal conductivity of approximately 2 to 30 W/mK in order to disperse heat generated in an integrated circuit.

A method of peeling off the circuit portion from the insulating substrate 800 is not limited to the method using the etching of the silicon film as shown in this embodiment mode, and various other methods can also be used. For example, there is a method where a metal oxide film is formed between a substrate with high heat resistance and an integrated circuit, and the metal oxide film is weakened by crystallization to be able to peel off the integrated circuit. Alternatively, there is a method where a peeling layer is broken by laser irradiation to be able to peel off an integrated circuit from a substrate. Further alternatively, there is a method where a substrate over which an integrated circuit is formed is removed mechanically or by etching using a solution or a gas to be able to peel off the integrated circuit from the substrate.

The electronic pen including the TFTs shown in this embodiment mode can accurately read information written down on a display portion as electronic information without using an image sensor and store the electronic information. Further, since the electronic pen including the TFTs described in this embodiment mode receives electric power wirelessly from the outside and stores the electric power in a battery for carrying out a circuit operation, change of the battery is not needed. In addition, since charging is conducted wirelessly, the pen can be charged while being used, and a large-sized rechargeable battery is not needed. Accordingly, a small and light-weight writing instrument can be provided.

This application is based on Japanese Patent Application serial no. 2006-236769 filed in Japan Patent Office on Aug. 31, 2006, the entire contents of which are hereby incorporated by reference.

What is claimed is:

1. An electronic pen comprising:
    a battery which can be charged wirelessly from outside the electronic pen;
    a first antenna circuit which is electrically connected to the battery, the first antenna circuit comprising a first antenna;
    a pen nib;
    a plurality of first sensors which senses whether the pen nib has contact with a surface;
    a second sensor which detects movement of the pen nib on the surface;
    a control circuit which is electrically connected to the plurality of first sensors and the second sensor; and
    a memory which is electrically connected to the control circuit,
    wherein the pen nib is between the plurality of first sensors, and
    wherein the second sensor is a capacitance type acceleration sensor.

2. The electronic pen according to claim 1, wherein the battery is one selected from the group consisting of a lithium battery, a lithium polymer battery, a lithium ion battery, a nickel metal hydride battery, a nickel-cadmium battery, an organic radical battery, a lead-acid battery, an air secondary battery, a nickel-zinc battery, a silver-zinc battery, and an electric double layer capacitor.

3. The electronic pen according to claim 1, wherein the battery is electrically connected to a constant current source circuit.

4. The electronic pen according to claim 1, wherein the battery is electrically connected to a remaining amount detection circuit which detects a remaining amount of the battery and a modulation circuit which modulates output of the remaining amount detection circuit.

5. The electronic pen according to claim 1, wherein the memory is detachable and configured to be directly connected to a computer.

6. The electronic pen according to claim 1,
    wherein the first antenna circuit and the battery are provided on a substrate.

7. The electronic pen according to claim 1, further comprising a third antenna circuit, and a fourth antenna circuit,
    wherein the first antenna circuit, the third antenna circuit, the fourth antenna circuit, and the battery are provided over a substrate.

8. An electronic pen system comprising:
    an electronic pen comprising:
        a battery which can be charged wirelessly from outside the electronic pen, a first antenna circuit which is electrically connected to the battery, the first antenna circuit comprising a first antenna;

a pen nib;

a plurality of first sensors which senses whether the pen nib has contact with a surface;

a second sensor which detects movement of the pen nib on the surface;

a control circuit which is electrically connected to the plurality of first sensors and the second sensor; and a memory which is electrically connected to the control circuit; and a display portion comprising:

the surface and a second antenna circuit which transmits an electromagnetic wave to the first antenna circuit for charging the battery, wherein the second sensor is configured to operate only when the contact between the pen nib and the surface is sensed by the plurality of first sensors, wherein the plurality of first sensors, the second sensor, the control circuit, and the memory operate by supply of electric power from the battery, wherein the pen nib is between the plurality of first sensors, and wherein the second sensor is a capacitance type acceleration sensor.

9. The electronic pen system according to claim 8, wherein the battery is one selected from the group consisting of a lithium battery, a lithium polymer battery, a lithium ion battery, a nickel metal hydride battery, a nickel-cadmium battery, an organic radical battery, a lead-acid battery, an air secondary battery, a nickel-zinc battery, a silver-zinc battery, and an electric double layer capacitor.

10. The electronic pen system according to claim 8, wherein the battery is electrically connected to a constant current source circuit and a switch circuit, and depending on a charge state of the battery, the battery is electrically connected to a charge control circuit which controls the switch circuit.

11. The electronic pen system according to claim 8, wherein the battery is electrically connected to a remaining amount detection circuit which detects a remaining amount of the battery and a modulation circuit which modulates output of the remaining amount detection circuit.

12. The electronic pen system according to claim 8, wherein the memory is detachable and configured to be directly connected to a computer.

13. The electronic pen system according to claim 8, wherein the first antenna circuit and the battery are provided on a substrate.

14. The electronic pen system according to claim 8, further comprising a third antenna circuit, and a fourth antenna circuit, wherein the first antenna circuit, the third antenna circuit, the fourth antenna circuit, and the battery are provided over a substrate.

15. The electronic pen system according to claim 8, wherein a position information of the electronic pen is obtained by detecting information about acceleration, time, and whether the pen nib is in contact with the display portion several times to several hundreds of times a second, and double-integrating data of acceleration over time.

16. An electronic pen system comprising:

an electronic pen comprising:

a battery which can be charged wirelessly from outside the electronic pen;

a pen nib;

a plurality of first sensors which senses whether the pen nib has contact with a surface;

a second sensor which detects movement of the pen nib on the surface;

a first antenna circuit which is electrically connected to the battery, the first antenna circuit comprising a first antenna;

a control circuit electrically connected to the plurality of first sensors; and a memory electrically connected to the control circuit; and a display portion comprising:

a second antenna circuit which transmits an electromagnetic wave to the first antenna circuit for charging the battery, wherein the second sensor is configured to operate only when the contact between the pen nib and the surface is sensed by the plurality of first sensors, wherein the plurality of first sensors, the control circuit, and the memory operate by supply of electric power from the battery, wherein the pen nib is between the plurality of first sensors, wherein the second sensor is in a body of the electronic pen, and wherein the second sensor is a capacitance type acceleration sensor.

17. The electronic pen system according to claim 16, wherein the battery is one selected from the group consisting of a lithium battery, a lithium polymer battery, a lithium ion battery, a nickel metal hydride battery, a nickel-cadmium battery, an organic radical battery, a lead-acid battery, an air secondary battery, a nickel-zinc battery, a silver-zinc battery, and an electric double layer capacitor.

18. The electronic pen system according to claim 16, wherein the battery is electrically connected to a constant current source circuit and a switch circuit, and depending on a charge state of the battery, the battery is electrically connected to a charge control circuit which controls the switch circuit.

19. The electronic pen system according to claim 16, wherein the battery is electrically connected to a remaining amount detection circuit which detects a remaining amount of the battery and a modulation circuit which modulates output of the remaining amount detection circuit.

20. The electronic pen system according to claim 16, wherein the memory is detachable and configured to be directly connected to a computer.

21. The electronic pen system according to claim 16, wherein the first antenna circuit and the battery are provided on a substrate.

22. The electronic pen system according to claim 16, further comprising a third antenna circuit, and a fourth antenna circuit, wherein the first antenna circuit, the third antenna circuit, the fourth antenna circuit, and the battery are provided on a substrate.

23. The electronic pen system according to claim 16, wherein a position information of the electronic pen is obtained by detecting information about acceleration, time, and whether the pen nib is in contact with the display portion several times to several hundreds of times a second, and double-integrating data of acceleration over time.

* * * * *